United States Patent
Liu et al.

(10) Patent No.: US 11,003,638 B2
(45) Date of Patent: May 11, 2021

(54) SYSTEM AND METHOD FOR BUILDING AN EVOLVING ONTOLOGY FROM USER-GENERATED CONTENT

(71) Applicants: Beijing Jingdong Shangke Information Technology Co., Ltd., Beijing (CN); JD.com American Technologies Corporation, Mountain View, CA (US)

(72) Inventors: Shizhu Liu, Mountain View, CA (US); Kailin Huang, Mountain View, CA (US); Li Chen, Mountain View, CA (US); Jianxun Sun, Mountain View, CA (US); Ning Xu, Mountain View, CA (US); Chengchong Zhang, Mountain View, CA (US); Hui Zhou, Mountain View, CA (US)

(73) Assignees: Beijing Jingdong Shangke Information Technology Co., Ltd., Beijing (CN); JD.com American Technologies Corporation, Mountain View, CA (US)

(*) Notice: Subject to any disclaimer, the term of this patent is extended or adjusted under 35 U.S.C. 154(b) by 212 days.

(21) Appl. No.: 16/174,140

(22) Filed: Oct. 29, 2018

(65) Prior Publication Data
US 2020/0134058 A1    Apr. 30, 2020

(51) Int. Cl.
*G06F 16/00* (2019.01)
*G06F 16/21* (2019.01)
(Continued)

(52) U.S. Cl.
CPC ........ *G06F 16/213* (2019.01); *G06F 16/2379* (2019.01); *G06F 16/285* (2019.01)

(58) Field of Classification Search
CPC ... G06F 16/213; G06F 16/2379; G06F 16/285
(Continued)

(56) References Cited

U.S. PATENT DOCUMENTS

| 7,930,302 B2* | 4/2011 | Bandaru | ................ G06F 40/30 |
| | | | 707/737 |
| 8,458,115 B2 | 6/2013 | Cai et al. | |

(Continued)

OTHER PUBLICATIONS

Tomas Mikolov, Ilya Sutskever et al, Distributed representations of words and phrases and their compositionality, 2013, arXiv:1310. 4546 [cs.CL].

(Continued)

*Primary Examiner* — Michelle N Owyang
(74) *Attorney, Agent, or Firm* — China Science Patent & Trademark US LLC; Shanyun Lu

(57) ABSTRACT

A method and system for constructing an evolving ontology database. The method includes: receiving a plurality of data entries; calculating semantic similarity scores between any two of the data entries; clustering the data entries into a multiple current themes based on the semantic similarity scores; selecting, new concepts from the current themes by comparing the current themes with a plurality of previous themes prepared using previous data entries; and updating the evolving ontology database using the new concepts. The semantic score between any two of the data entries are calculated by: semantic similarity score=$\Pi_{i=0}^{n} s_i e^{\Sigma_{j=0}^{k} w_j \times f_j}$, where $s_i$ is weight of features sources, $f_j$ is a feature similarity between the two of the data entries, $w_j$ is a weight of $f_j$, and j, k and n are positive integers.

18 Claims, 9 Drawing Sheets

(51) Int. Cl.
  *G06F 16/28* (2019.01)
  *G06F 16/23* (2019.01)
(58) Field of Classification Search
  USPC .................................................. 707/600–899
  See application file for complete search history.

(56) References Cited

U.S. PATENT DOCUMENTS

| | | | |
|---|---|---|---|
| 10,078,843 B2 | 9/2018 | Dadia et al. | |
| 10,303,688 B1* | 5/2019 | Sirin | G06F 16/24542 |
| 10,878,191 B2* | 12/2020 | Rachevsky | G06F 16/367 |
| 2011/0004588 A1* | 1/2011 | Leitersdorf | G06F 16/951 |
| | | | 707/711 |
| 2011/0264649 A1* | 10/2011 | Hsiao | G06N 5/022 |
| | | | 707/722 |
| 2013/0138696 A1* | 5/2013 | Turdakov | G06F 16/367 |
| | | | 707/794 |
| 2014/0195518 A1* | 7/2014 | Kelsey | G06F 16/367 |
| | | | 707/722 |
| 2014/0324750 A1* | 10/2014 | Christophe | G06F 16/353 |
| | | | 706/46 |

OTHER PUBLICATIONS

Quoc Le, Tomas Mikolov, Distributed representations of sentences and documents, Proceedings of the 31st International Conference on Machine Learning, Beijing, China, 2014, JMLR 32(2): 1188-1196.

Yoon Kim, Convolutional Neural Networks for Sentence Classification, arXiv:1408.5882 [cs.CL].

Lei Tang, Jianping Zhang, Huan Liu, Automatically adjusting content taxonomies for hierarchical classification, Proceedings, 2006.

Bo Pang and Lillian Lee, Opinion mining and sentiment analysis, Foundations and Trends in Information Retrieval, 2008 V2(1-2): 1-135.

David M Blei, Probabilistic topic models, Communications of the ACM, 2012, V55(4): 77-84.

Kunal Punera, Suju Rajan, Joydeep Ghosh, Automatically learning document taxonomies for hierarchical classification, Special interest tracks and posters of the 14th international conference on World Wide Web, 2005, pp. 1010-1011.

Mikolov, Tomas; et al. Efficient estimation of word representations in vector space, 2013, CoRR, abs/1301.3781.

Sanjeev Arora, Yingyu Liang, Tengyu Ma, A simple but tough-to-beat baseline for sentence embeddings, ICLR 2017.

Yiming Yang, Thomas Ault, Thomas Pierce and Charles W Lattimer, Improving text categorization methods for event tracking, SIGIR '00 Proceedings of the 23rd annual international ACM SIGIR conference on Research and development in information retrieval, 2000, pp. 65-72.

Jian Zhang, Zoubin Ghahramani and Yiming Yang, A probabilistic model for online document clustering with application to novelty detection, NIPS'04 Proceedings of the 17th International Conference on Neural Information Processing Systems, 2004, pp. 1617-1624.

Matt J. Kusner, Yu Sun, Nicholas I. Kolkin, Kilian Q. Weinberger, From word embeddings to document distances, Proceedings of the 32nd International Conference on Machine Learning, Lille, France, JMLR: W&CP, 2015, v37: 857-966.

Dingquan Wang, Weinan Zhang, Gui-Rong Xue, and Yong Yu, Deep classifier for large scale hierarchical text classification, Proceedings, 2009.

David M. Blei, John D. Lafferty, Dynamic topic models, Proceedings of the 23rd International Conference on Machine Learning, Pittsburgh, PA, 2006, pp. 113-120.

Wilas Chamlertwat, Pattarasinee Bhattarakosol, Tippakorn Rungkasiri, Discovering consumer insight from twitter via sentiment analysis, Journal of Universal Computer Science, 2012, V18(8): 973-992.

* cited by examiner

SYSTEM AND METHOD FOR BUILDING AN EVOLVING ONTOLOGY FROM USER-GENERATED CONTENT

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present disclosure relates generally to building an evolving ontology from complex and dynamic data, and more particularly to systems and methods for building an evolving ontology from user generated content on an e-commerce website.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Computer-mediated communication is becoming the most convenient and important way of sharing and exchanging information nowadays in the society. People can directly submit their feedbacks to a particular merchant or manufacturer, and conduct online research before making many of their traditional consumer purchase decisions by reading other user's reviews. However, it's hard to utilize the large volume and diverse user-generated content on the web efficiently by simply checking a single review score or a number of positive or negative reviews.

Therefore, an unaddressed need exists in the art to address the aforementioned deficiencies and inadequacies.

SUMMARY

In certain aspects, the present disclosure relates to a method for constructing an evolving ontology database. In certain embodiments, the method includes:

receiving, by a computing device, a plurality of data entries;

calculating, by the computing device, semantic similarity scores between any two of the data entries based on feature sources and feature similarities of the data entries; clustering, by the computing device, the data entries into a plurality of current themes based on the semantic similarity scores;

selecting, by the computing device, new concepts from the current themes by comparing the current themes with a plurality of previous themes prepared using previous data entries; and updating, by the computing device, the evolving ontology database using the new concepts.

In certain embodiments, the semantic score between any two of the data entries are calculated by:
semantic similarity $$\text{score} = \prod_{i=0}^{n} s_i e \sum_{j=0}^{k} w_j \times f_j,$$

wherein $s_i$ is weight of the features sources, $f_j$ is one of the feature similarities between the two of the data entries, $w_j$ is a weight of $f_j$, and j, k and n are positive integers.

In certain embodiments, the data entries are user generated feedbacks, and the step of calculating semantic similarity scores includes: predicting sentiment similarity values by a sentiment analyzer, the sentiment similarity values representing similarity between the two data entries in regard to positive feedback, negative feedback, neutral feedback, very negative feedback, and internet abuse; predicting text similarity values by a similarity calculator, the text similarity values representing similarity between semantic meaning of text extracted from the two data entries; and predicting syntactic similarity values by a neutral language parser, the syntactic similarity values representing syntactic complexity of the text of the two data entries.

In certain embodiments, the step of clustering the data entries further includes: calculating a semantic similarity score for the two data entries using the sentiment similarity values, the text similarity values, and the syntactic similarity values.

In certain embodiments, the step of selecting the new concepts from the current themes includes: retrieving the current themes and the previous themes; identifying near duplicate themes from the current themes and the previous themes; removing the near duplicated themes from the current themes to obtain non-duplicate themes; comparing the non-duplicate themes to concepts in the ontology database to obtain novel concepts candidates, wherein the novel concepts candidates are the non-duplicate themes that have low similarity to any of the concepts in the ontology database; and verifying the novel concepts candidates according to an instruction from a manager of the ontology database, to obtain the new concepts.

In certain embodiments, the step of updating the evolving ontology database includes: detecting a most relevant parent concepts by comparing the at least one verified concept with the concepts in the ontology; computing similarity between the at least one verified concept and sibling concepts to obtain a most similar sibling concepts, wherein the sibling concepts are child concepts of the most relevant parent concept; proposing ontology adjustments based on the most relevant parent concept and the most similar sibling concept; and using an optimal adjustment from the proposed ontology adjustments to update the ontology.

In certain embodiments, the proposed adjustment includes an insertion adjustment, and in the insertion adjustment, the new concept is defined as a child node of the most relevant parent concept.

In certain embodiments, the proposed adjustment includes a lift adjustment, and in the lift adjustment, the new concept is defined as a sibling node of the most relevant parent concept.

In certain embodiments, the proposed adjustment includes a shift adjustment, and in the shift adjustment, the new concept is defined as a child node of the most similar sibling concept.

In certain embodiments, the proposed adjustment includes a merge adjustment, and in the merge adjustment, the new theme is combined with the most similar sibling concept to form a combined concept, the combined concept is defined as a child node of the most relevant parent concept, and the new theme and the most similar sibling concept are defined as child nodes of the combined concept.

In certain embodiments, each concept in the ontology data base is defined by a classification model, and the classification model comprises a logistic regression model and a gradient boosting classifier.

In certain embodiments, the method further includes: tuning the classification model according to the updated ontology.

In certain embodiments, the method further includes: cleaning and tokenizing the data entries before the step of calculating semantic similarity scores.

In certain aspects, the present disclosure relates to a system for constructing an evolving ontology database. In certain embodiments, the system includes a computing device. The computing device has a processor and a storage device storing computer executable code. The computer executable code, when executed at the processor, is configured to perform the method described above.

In certain aspects, the present disclosure relates to a non-transitory computer readable medium storing computer executable code. The computer executable code, when executed at a processor of a computing device, is configured to perform the method as described above.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

DETAILED DESCRIPTION

Figure 1:
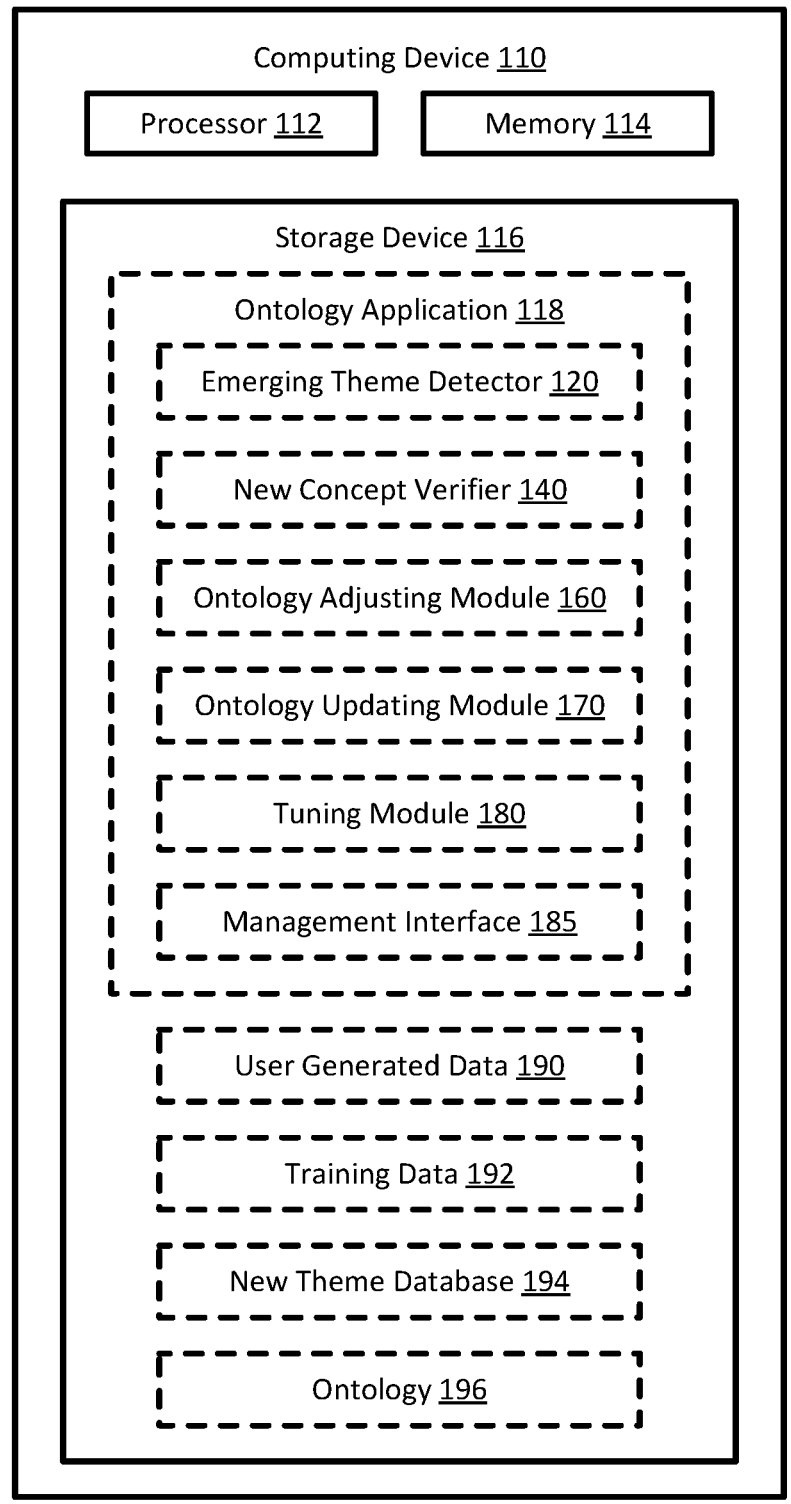
FIG. 1 schematically depicts an evolving ontology system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, "plurality" means two or more.

As used herein, the terms "comprising", "including", "carrying", "having", "containing", "involving", and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure. As used herein, the term "and/or" includes any and all combinations of one or more of the associated listed items.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

In certain aspects, to utilize the large volume and diverse user-generated content on the web, the present disclosure provide an ontology structure for such dataset, so as to improve the efficiency of a lot of downstream semantic analysis work. The challenges to construct ontology on such data may stem from two characteristics of user-generated content. First, domain knowledge is very limited or difficult to get. Summarizing concepts and semantic relations from such large volumes of data by human is inefficient and ineffective. Second, the underlying structure of such ontology is evolving over time. Emerging themes keep occurring. Thus, new concepts need to be created and related ontology structures are required to adjust and optimize accordingly.

In certain embodiments, a hierarchy structure is curated manually, and hierarchical machine learning classifiers are trained for semantic analysis. However, this method heavily depends on human efforts to understand content and to label training data, and this method cannot track the changes of the data automatically.

In certain embodiments, data stream is partitioned into temporal segments, semantic analysis is applied on each segment, and then the emerging themes are identified within the segment. Although this approach can detect hot events and novel concepts, it fails to capture the hierarchy structure among concepts.

In certain embodiments, entities from dataset are extracted, and they are linked to a well-built universal knowledge graph. Further semantic analysis and inference can be conducted based on the knowledge graph. The limit of this method is that the universal knowledge graph is stable and thus cannot catch the pace of quickly changing semantic structures of user generated data. Also, it is costly since the universal knowledge graph needs to be maintained by a large group of experts. Moreover, this method is not able to discover concepts absent in the existing knowledge graphs.

To overcome these challenges and disadvantages, in certain aspect, the present disclosure provides a semantic analysis framework to detect emerging themes from large-scale, evolving data streams, and a set of methods are further provided to verify new concepts and optimize relevant ontology structures. In certain embodiments, the present disclosure provides a system using natural language processing, active learning, semi-supervised learning technology together with principled human-computer interactions.

In certain embodiments, this system is composed of two parts: 1) a real time semantic analysis pipeline which automatically mines and detects emerging themes and new concepts from user-generated data; and 2) management interfaces to demonstrate the analysis results and facilitate system administrators to search, verify and adjust the ontology structures.

The semantic analysis pipeline contains three modules:

1. A semantic analyzer keeps clustering items belonging to same topics from data stream. At this very first step of whole pipeline, we utilize natural language parser to extract the fact part of text, calculate the semantic similarity score between two items based on word embedding and sentence embedding, and predict the sentiment polarity of given text.

2. The temporal analysis module is in charge of predicting if the found emerging themes are about the known topics or new concept.

3. An ontology optimization module is designed to maintain and adjust the semantic relations between the concepts, and start the training process of the machine learning models according to analysis results and verification.

The management interfaces provide these following utilities:

1. Visualization interfaces to demonstrate the detected themes, along with related statistic information, generated summarization, sentiment distribution and suggested semantic relation with existing concepts.

2. Management interfaces to verify the validation of detected concepts, to edit the semantic relations inside ontology structures, and to control the training procedure of machine models and to supervise the model prediction results.

FIG. 1 schematically depicts an evolving ontology system according to certain embodiments of the present disclosure. As shown in FIG. 1, the system 100 includes a computing device 110. In certain embodiments, the computing device 110 may be a server computer, a cluster, a cloud computer, a general-purpose computer, a mobile device, a tablet, or a specialized computer, which constructs an ontology based on historical data or/and current data, and updates the ontology based on new inputs of the data, so as to make the ontology model evolve with the updated data automatically with minimal supervision. In certain embodiments, the computing device 110 may communicate with other computing devices or services, so as to obtain user generated data from those computing devices to update the ontology, and provide the ontology to those computing devices. In certain embodiments, the communication is performed via a network, which may be a wired or wireless network, and may be of various forms, such as a public network and a private network.

As shown in FIG. 1, the computing device 110 may include, without being limited to, a processor 112, a memory 114, and a storage device 116. In certain embodiments, the computing device 110 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 112 may be a central processing unit (CPU) which is configured to control operation of the computing device 110. The processor 112 can execute an operating system (OS) or other applications of the computing device 110. In some embodiments, the computing device 110 may have more than one CPU as the processor, such as two CPUs, four CPUs, eight CPUs, or any suitable number of CPUs. The memory 114 can be a volatile memory, such as the random-access memory (RAM), for storing the data and information during the operation of the computing device 110. In certain embodiments, the memory 114 may be a volatile memory array. In certain embodiments, the computing device 110 may run on more than one memory 114. The storage device 116 is a non-volatile data storage media for storing the OS (not shown) and other applications of the computing device 110. Examples of the storage device 116 may include non-volatile memory such as flash memory, memory cards, USB drives, hard drives, floppy disks, optical drives, solid-state drive (SSD) or any other types of data storage devices. In certain embodiments, the storage device 116 may be a local storage, a remote storage, or a cloud storage. In certain embodiments, the computing device 110 may have multiple storage devices 116, which may be identical storage devices or different types of storage devices, and the applications of the computing device 110 may be stored in one or more of the storage devices 116 of the computing device 110. In certain embodiments, the computing device 110 is a cloud computer, and the processor 112, the memory 114 and the storage device 116 are shared resources provided over the Internet on-demand.

As shown in FIG. 1, the storage device 116 includes an ontology application 118, and at least one of user generated data 190, training data 192, new theme database 194, and ontology 196. The ontology application 118 is configured to construct an ontology and update the ontology using the data.

The ontology application 118 includes, among other things, an emerging theme detector 120, a new concept verifier 140, an ontology adjusting module 160, an ontology updating module 170, a tuning module 180, and a management interface 185. In certain embodiments, the ontology application 118 may include other applications or modules necessary for the operation of the ontology application 118. It should be noted that the modules are each implemented by computer executable codes or instructions, or data table or databases, which collectively forms one application. In certain embodiments, each of the modules may further include sub-modules. Alternatively, some of the modules may be combined as one stack. In other embodiments, certain modules may be implemented as a circuit instead of executable code. In certain embodiments, some or all of the modules of the ontology application 118 may be located at a remote computing device or distributed in a cloud.

Figure 2A:
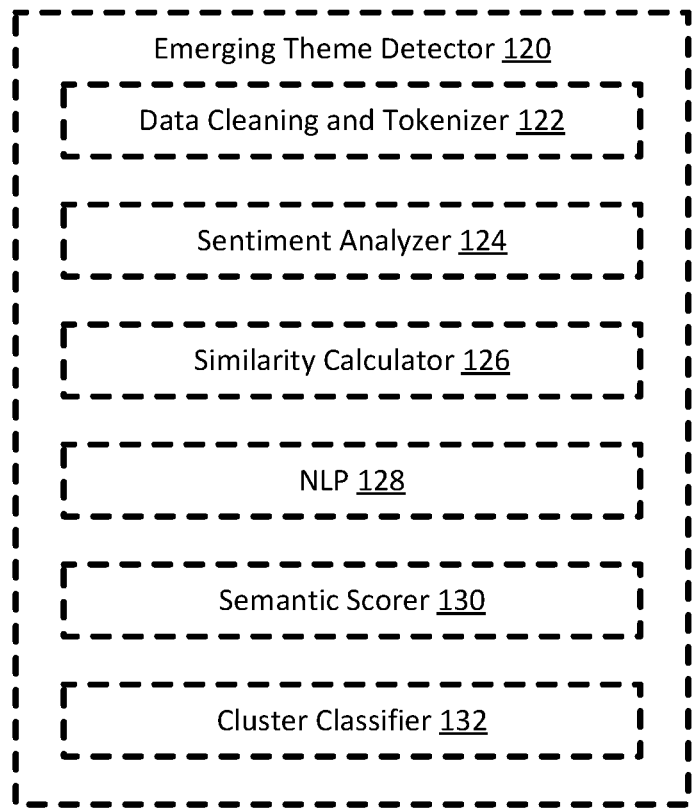
FIG. 2A schematically depict an emerging theme detector according to certain embodiments of the present disclosure.

The emerging theme detector 120 is configured to, upon receiving or retrieving data entries from the user generated data 190, score semantic distance between each pair of data entries and cluster entries based on topics, so as to generate themes of the user generated data 190. The emerging theme detector 120 may retrieve data entries in a specified time range, such as last week, last month, or last quarter (season), or may be a certain number of most recent data entries, such as the last 1,000 data entries, the last 10,000 data entries, or the last 100,000 data entries. In one example, emerging theme detector 120 retrieves data entries for the last week, which is termed week 0. Referring to FIG. 2A, the emerging theme detector 120 includes a data cleaning and tokenizer 122, a sentiment analyzer 124, a similarity calculator 126, a natural language parser (NLP) 128, a semantic scorer 130, and a cluster classifier 132.

The data entries from the user generated data 190, such as feedbacks on an e-commerce platform, may include noises. The data cleaning and tokenizer 122 is configured to retrieve data entries from the user generated data 190, clean and tokenize those data entries, and send those tokenized data entries to the sentiment analyzer 124, the similarity calculator 126, and the NLP 128. In certain embodiments, the cleaning process refers to removing certain symbols or words that is irrelevant for the downstream work. In certain embodiments, sciki-learn may be used to perform the cleaning. Specifically, the data cleaning and tokenizer 122 may use the class listed in http://scikit-learn.org/stable/modules/generated/sklearnm.feature_extraction.text.TfidfVectorizer.html. For example, one of the attributes of the above class is "stop_words," and the data cleaning and tokenizer 122 provides a list of stop words, and in operation of the stop_words, remove the listed stop words from the data entries. In one example, user 1 submitted a feedback, "the color of this under armor T-shirt is cool," and the words "the," "of" and "this" are included in the list of stop words, then the output could be: identifier "user 1, feedback No. 123," clean text "color, under, armor, T-shirt, cool."

The data cleaning and tokenizer 122 is further configured to, after cleaning of the data entries, tokenize the cleaned data entries based on a dictionary. For example, if the mapping between the token string and their id is {armor:0; color:1, cool:2, T-shirt:3, under:4}, then the clean text "color, under, armor, T-shirt, cool," after tokenization provides an output that is a list with token ids [1, 4, 0, 3, 2]. By the data cleaning and tokenization, each tokenized data entry is represented by a user identifier, a feedback identifier and a token of clean text. The data cleaning and tokenization module 122 is further configured, after cleaning and tokenization, send the tokenized data entries to the sentiment analyzer 124, the similarity calculator 126, and the NLP 128.

The sentiment analyzer 124 is configured to, upon receiving the tokenized data entries, predict sentiment polarity of the cleaned text of each data entry. In certain embodiments, the sentiment is represented by a vector, and each dimension of the vector defining a sentiment. In certain embodiments, five different sentiments are defined: positive, neutral, negative, very negative, and internet abuse. The correlation between the tokenized data entry and the sentiments is represented by a number from 0 to 1. 1 indicates high correlation and 0 indicates no correlation. In certain embodiments, the representation value of the sentiments are normalized, such that the sum of the representation values of all the sentiments is 1. In one example, the result of analyzing a tokenized data entry by the sentiment analyzer 124 is [0.7, 0.2, 0.1, 0.0, 0.0], i.e., positive 0.7, neutral 0.2, negative 0.1, very negative 0.0, and internet abuse 0.0. Accordingly, the data entry is very likely a positive feedback, possibly neutral, and very low possibility of negative. In certain embodiments, the sentiment analyzer 124 uses certain techniques described by Pang, Bo et al. (Pang, Bo and Lee, Lillian, Opinion mining and sentiment analysis, Foundations and Trends in Information Retrieval, 2008, Vol. 2: No. 1-2, pp 1-135, which is incorporated herein by reference in its entirety. In certain embodiments, the sentiment analyzer 124 is a convolutional neural network classifier. In certain embodiments, the sentiment analyzer 124 is trained in advance using a set of training data included in the training data 192, where each data entry in the set of training data includes tokenized value and is labeled with their corresponding sentiment attributes. In certain embodiments, the label of the training data entry may be 1 for one of the sentiments and 0 for the other sentiments. However, after training, the sentiment analyzer 124 may assign a number between 0 to 1 for one or more of the sentiments for each data entry, so as to more accurately represent the data entries in regard to the five different sentiments. The sentiment analyzer 124 is further configured to, after obtaining the sentiment vectors of the data entries, send the sentiment vectors to the semantic scorer 130.

The similarity calculator 126 is configured to, upon receiving the tokenized data entries, determine similarity between each pair of cleaned text based on sentence embedding. Here clean texts from any two of the data entries form a pair. Each clean text of a data entry is represented by a vector. In certain embodiments, the word representation in vector space uses the method described by Mikolov, Thomas et al. (Mikolove, Tomas et al, efficient estimation of word representation in vector space, 2013, arxiv:1301.3781v3), which is incorporated herein by reference in its entirety. Through word embedding, the words in a cleaned text are mapped to vectors of real numbers. The vectors of one data entry text in the pair and the vector of the other data entry text in the pair are compared to determine a similarity or distance between them. In certain embodiments, the similarity calculator 126 uses the method described in Kusner, et al. (Kusner et al. From word embedding to document distances, Proceedings of Machine Learning Research, 2015, V37, pp. 957-966), which is incorporated herein by reference in its entirety. In certain embodiments, the similarity score between each pair of data entries is normalized to 0-1, wherein 0 indicates no similarity and 1 indicates substantially the same. In one example, the similarity between the clean texts from two data entries is 0.7, which indicates a high similarity between the two data entries or a close distance of the two data entries in the vector space. The similarity calculator 126 is further configured to, after obtaining the similarity score between any two of the data entries, send the similarity scores to the semantic scorer 130.

The NLP 128 is configured to, upon receiving the tokenized data entries, determine the syntactic structure of the text by analyzing its constituent words based on an underlying grammar. In certain embodiments, the syntactic features are part-of-speech tags. In certain embodiments, a pretrained model, for example, the Stanford parser (https://nlp.stanford.edu/software/lex-parser.shtml) is used, which is incorporated herein by reference in its entirety. In certain embodiments, the NLP 128 is further configured to process the initial parser output to provide certain statistic result. For example, after syntactic parsing, the NPL parser 128 may further count the number of nouns and the number of verbs in the output. When a data entry has a result of 3 and 1, the text of the data entry includes 3 nouns and 1 verb. This simple yet novel character of the text is useful for the following accurate ontology construction and update. In certain embodiments, the NLP 128 is further configured to evaluate the syntactic or grammar complexity of the data entry, and represent the complexity as a real number. In certain embodiments, the NLP 128 is configured to calculate the complexity using the number of unique words, the number of verb, the number of noun, the number of verb phrase, and the number of noun phrase. For example, For example, assuming the maximum number of the unique words of text in all datasets (such as all the training datasets) is $C_0$ (e.g. 100), the maximum number of verb phrases of text in all datasets is $V_0$ (e.g. 10), the maximum number of noun phrases of text in all dataset is No (e.g. 20). For a given text t, it contains $c_1$ unique words (e.g. 20), $v_1$ verb phrases (e.g. 2), $n_1$ noun phrases (e.g. 5), the complexity of text t can be calculated with the formula: $((c_1+1) \times (v_1+1) \times (n_1+1))/((C_0+1) \times (V_0+1) \times (N_0+1))$. In certain embodiments, the value of the complexity, that is, a real number, is used as the result of the NLP 128. The NLP 128 is further configured to, after obtaining the result, send the result to the semantic scorer 130.

The semantic scorer 130 is configured to, upon receiving the different aspects of semantic information from the sentiment analyzer 124, the similarity calculator 126, the NPL parser 128, that is, the sentiment vectors of the texts of the data entries, the similarity scores between each pair of texts of the data entries, and the parsing result of the texts of the data entries, calculate a semantic similarity score between each pair (any two) of the texts. The semantic similarity score between each pair of texts is calculated by the formula:

semantic similarity $$\text{score} = \prod_{i=0}^{n} s_i e \sum_{j=0}^{k} w_j \times f_j$$

n corresponds to the major types of features or the feature sources. Here n is 2, where i=0, 1 or 2 respectively corresponding to the sentiment features from the sentiment analyzer 124, the text similarity features from the similarity calculator 126, and the syntactic features from the NPL parser 128. $s_i$ is the weight of the feature sources. In certain embodiments, $s_i \in [0, 1.0]$ and $\Sigma_{i=0}^{n} s_i = 1$. In other words, each of $s_i$ equals to a number between 0 and 1 (including 0 and 1), and the sum of all $s_i$ is 1. In certain embodiments, $s_i$ for the sentiment features, the text similarity features, and syntactic features are 0.10, 0.85 and 0.05 respectively. $f_j$ is a feature function that measures the similarity between two data entries. Each of the feature sources, sentiment, text similarity, syntactic, may include one or more feature functions, and the total number of feature functions is k. For example, $f_{sentiment}$ can be the cross entropy of two entries' sentiment distribution, $f_{fact}$ can be cosine similarity of two entries' noun phrases Tf-idf vectors, and the method is expandable where a new feature function can be incorporated in the above formula easily by adding a new $f_j$ and a corresponding new $w_j$. $w_j$ is a weight of $f_j$. The higher the semantic similarity score between two data entries, the more similar the two data entries are. In certain embodiments, the weights $w_j$ can be set at arbitrary values and will be optimized automatically during the training. After obtaining the semantic similarity score between each pair of data entries, the semantic scorer 130 is configured to send the semantic similarity scores to the cluster classifier 132. In certain embodiments, the parameters $s_i$, $f_j$, and $w_j$ are learned using training data entries retrieved from the training data 192, where semantic scores for each pair of training data entries are recorded to represent the relationship between the two training data entries. In other words, the feature functions are unsupervised models and are trained using training data. In certain embodiments, the training data are labeled with corresponding features before training the models. In other embodiments, some of the models can be trained without any labeling of data. In certain embodiments, feature functions such as sentiment prediction model requires human annotations for training. In certain embodiments, feature functions such as text similarity model does not require labeled data for training.

The cluster classifier 132 is configured to, upon receiving the semantic similarity scores between each pair of the texts of the two data entries, classify those data entries into clusters. In certain embodiments, for the set of data entries $\{e_1, e_2, \ldots, em\}$ belong to a cluster, the semantic scores of any pair of the data entries in this given set is greater than a pre-determined threshold t. The threshold can be chosen according to the system requirements. In certain embodiments, if the system needs high recall on the novel theme detection, it can use a small number (such as 2) as the threshold. Then most of the possible novel themes will be detected. In contrast, if the system needs high precision, it can use a relatively large number. For instance, assuming the average number of theme size within a week in the history is 50, we can use 60 as the threshold. Then all the detected clusters are very possible themes. After clustering, each cluster is defined as a new theme (concept candidate), and the clusters are stored in the new theme database 194. In certain embodiments, the new theme database 194 stores the new themes by batches or time intervals, such as a week, bi-weeks, a month, or a quarter. For example, the system may process a batch of data entries each week, and the new themes are stored weekly. Therefore, we have new themes of the current week, new themes of the week previous to the current week, new themes of the week before the previous week, and so on . . . . Those stored new themes are accessible to the new concept verifier 140. In certain embodiments, the cluster classifier 132, in addition to store the new themes, may also send a message to the new concept verifier 140, informing the new concept verifier 140 that a new batch of themes are available in the new theme database 194, so that the new concept verifier 140 can verify immediately whether any of the newly detected themes are qualified as new concepts.

Figure 2B:
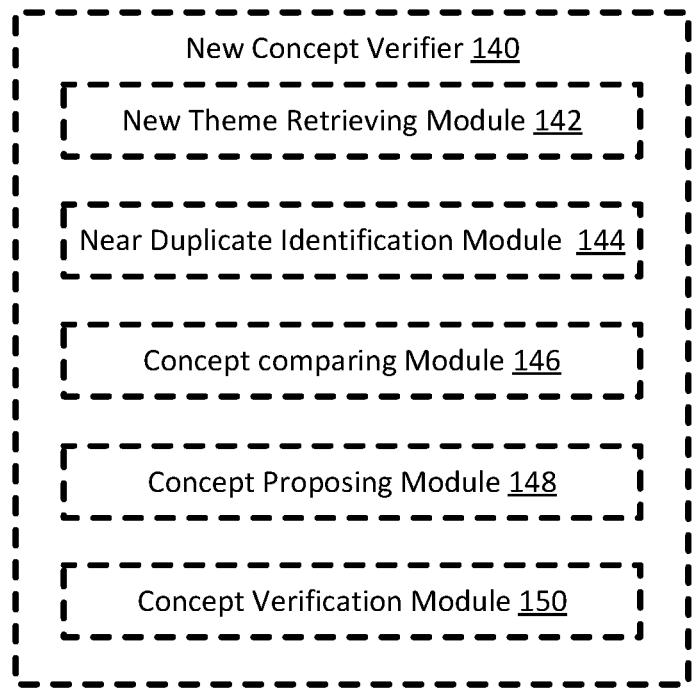
FIG. 2B schematically depict a new concept verifier according to certain embodiments of the present disclosure.

The new concept verifier 140 is configured to, retrieve new themes from the new theme database 194, and verify if any of the new themes are new concept. Here we define the new themes as recognized topics detected from the recent data stream, that is, the clusters detected by the cluster classifier 132, while define the new concept as verified new themes. In other words, the new themes are candidates for new concepts, and the new concepts are verified new themes. The verified new themes then can be used to update the ontology. As shown in FIG. 2B, the new concept verifier 140 includes a new theme retrieving module 142, a near duplicate identification module 144, a concept comparing module 146, a concept proposing module 148, and a concept verification module 150.

The new theme retrieving module 142 is configured to retrieving new themes from the new theme database 194. The new theme retrieving module 142 may retrieve those new themes in a pre-determined time interval such as weekly or monthly, or in response to a message from the cluster classifier 132 that new themes are stored in the new theme database 194, or an instruction from a system manager managing the system 100. In certain embodiments, the theme database 194 stores the new themes by week, and the new theme retrieving module 142 retrieves new themes of the most recent four weeks, and send the retrieved new themes to the near duplicate identification module 144. The new themes from the most recent four weeks include new themes form the current week and new themes from the previous three weeks, and are named week 0, week—1, week—2, week—3 respectively.

The near duplicate identification module 144, upon receiving the new themes from the new theme retrieving module 142, remove duplicated themes from the retrieved themes, so as to obtain most representative new themes. In certain embodiments, when a first theme is compared with a second theme for duplication: the near duplicate identification module 144 compares each data entry in the first theme with every data entry in the second theme to calculate semantic similarity scores; uses the semantic similarity scores to determine whether that data entry in the first theme belongs to the second theme; then computes the percentage of data entries in the first theme that belong to the second theme; and determines whether the first theme is a duplication of the second theme based on the percentage. The near duplicate identification module 144 may calculate the semantic similarity scores as described in related to the semantic scorer 130, or call the semantic scorer 130 to calculate the semantic scores. The near duplicate identification module 144 may use average semantic similarity score between each data entry in the first theme and the data entries in the second theme to determine whether that data entry in the first theme belongs to the second theme. The threshold of the average semantic score may be set in a rang of 0.6-1.0, or preferably above 0.7, or more preferably above 0.8 or 0.9. The near duplicate identification module 144 may determine the first theme is a duplication of the second theme when the percentage of the data entries in the first theme that belong to the second theme is greater than a pre-determined threshold. In certain embodiments, the threshold is set at about 0.6, preferably at about 0.7, and more preferably at about 0.8 or 0.9.

In certain embodiments, the near duplicate identification module 144 is configured to compare the themes in the current week with the themes in the previous weeks to determine duplicates by the method described above. In one example, the current week 0 includes a number of $T_0$ themes, week—1 includes a number of $T_1$ themes, week—2 includes a number of $T_2$ themes, week—3 includes a number of $T_3$ themes. Each of the themes in the $T_0$ themes is compared to the themes in the $T_1$, $T_2$, and $T_3$ themes, and the duplicated themes in the $T_0$ themes is defined as $T_0$-duplicate themes. The near duplicate identification module 144 removes the $T_0$-duplicate from the themes $T_0$, and obtains the nonduplicated themes $T_0$-nonduplicate by removing or deleting those duplicated themes ($T_0$-nonduplicate=$T_0$-$T_0$-duplicate). In certain embodiments, the $T_0$, $T_1$, $T_2$, and $T_3$ themes are combined together, and those themes are compared with each other to determine and remove the duplicated themes; the nonduplicated themes from the $T_0$ themes or from all the $T_0$, $T_1$, $T_2$, and $T_3$ themes are used for further processing. In yet another embodiments, the $T_1$, $T_2$, and $T_3$ themes are combined together, and the $T_0$ themes are compared to the combined themes, and the duplicated theme between the $T_0$ themes and the combined themes are removed from the $T_0$ themes. In certain embodiments, the new themes may be added as new concept directly to the ontology to initialize the ontology. In certain embodiments, the initial ontology may also be defined manually. After obtaining the nonduplicated themes, the near duplicate identification module 144 is further configured to send those representative new themes to the concept comparing module 146.

The concept comparing module 146 is configured to, upon receiving the nonduplicated themes, calculate the possibilities of whether the representative new themes belong to existing concepts or not. In certain embodiments, the concept comparing module 146 uses classification models of the existing concepts in the ontology to determined when a new theme belongs to a concept. In certain embodiments, for each concept in the ontology, a binary text classifier is provided and trained. In other words, each concept in the ontology 196 has its text classifier model. In certain embodiments, the machine learning model of these classifiers can be binary classifier such as logistic regression, gradient boosting classifier, and convolutional neural network, etc. (In certain embodiments, when a concept is created and added to the ontology, a collection of text documents are collected and may be verified for example by the system administrator. The documents are semantically similar and are used as positive samples of the model of the concept. Some other documents, which may be randomly selected from other existing categories or concepts, are used as negative samples. The new concept's corresponding text classifier will then be trained on the combination of positive and negative samples.) When the concept comparing module 146 performs the prediction whether a representative new theme (i.e., a nonduplicate theme) belongs to a concept in the ontology, the concept comparing module 146 inputs each text content of the data entries in one representative new theme to the binary text classifier, and obtains a Boolean value for that text content. The Boolean value indicates if the given feedback (data entry) belongs to the concept. When all the text contents in the one representative new theme are determined to be belonging to the concept or not, the percentage of the text contents that belong to the concept indicates the possibility that the representative new theme belongs to the concept. For example, if a representative new theme T contains 100 data entries, and the binary text classifier predicts that 90% of the data entries belong to a concept C, then the probability of the representative new theme T belonging to the concept C is 90%. After computing the possibilities and obtaining the possibility for each representative new theme belong to an available concept, the concept comparing module 146 is further configured to send the possibilities to the concept proposing module 148.

The concept proposing module 148 is configured to, upon receiving the possibilities for each representative new theme that belongs to one of the available concept, determine whether the representative new themes is a new concept candidate. For example, if a representative new theme T contains 100 data entries, and the binary text classifier predicts that 90% of the data entries belong to a concept C, then the probability of the representative new theme T belonging to the concept C is 90%. The possibility of the representative new theme T belonging to each of the concepts is determined, and the highest possibility of the representative new theme T belong to one of the concepts is regarded as the possibility that the representative new theme T belong to a concept in the ontology. If the highest possibility for one concept is greater than a pre-determined number, such as about 90%, the new theme T is determined to belong to an exist concept. In one example, for the top 5 concepts $C_1$, $C_2$, $C_3$, $C_4$ and $C_5$ that the new theme T most probably belongs to, the probability may be respectively 91%, 85% 81% 80% and 70%, and then the new theme T is determined to be belonging to $C_1$ because the highest percentage 91% is greater than a threshold of 90%. In another example, for the top 5 concepts $C_1'$, $C_2'$, $C_3'$, $C_4'$ and $C_5'$ that the new theme T' most probably belongs to, the probability may be respectively 89%, 83% 69% 69% and 65%, and then the new theme T does not belong to existing concepts because the highest possibility 89% is lower than the pre-determined threshold 90%. In certain embodiments, the threshold may be varied based on the characteristics of the data entries and the purpose of the project. After picking up the new concept candidates based on the possibilities, the concept proposing module 148 is further configured to send the new concept candidates to the concept verification module 150.

The concept verification module 150 is configured to, upon receiving the new concept candidates, verify the new concept candidate to obtain verified concepts. In certain embodiments, the concept verification module 150 verifies the new concept candidates automatically based on certain criteria. In certain embodiments, the concept verification module 150 provides an interface to show the new concept candidates to the system manager, and verifies the new concept candidates according to the instruction from the system manager via the interface. After verification, the concept verification module 150 discards the new concept candidates that fail the verification, and sends the verified new concepts to the ontology adjusting module 160. The verified new concepts are also simply termed verified concepts.

Figure 2C:
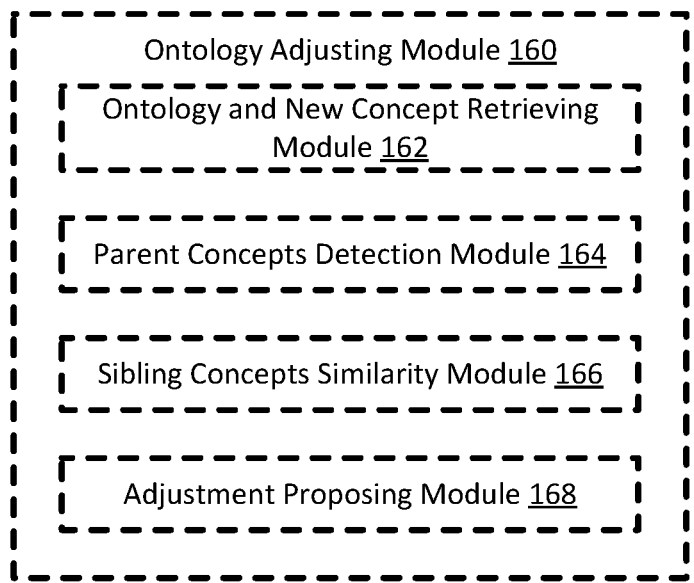
FIG. 2C schematically depict an ontology adjusting module according to certain embodiments of the present disclosure.

The ontology adjusting module 160 is configured to, upon receiving the verified concepts, propose adjustments of the ontology. Referring to FIG. 2C, the ontology adjusting module 160 includes an ontology and new concept retrieving module 162, a parent concepts detection module 164, a sibling concepts similarity module 166, and an adjustment proposing module 168.

The ontology and new concept retrieving module 162 is configured to retrieve the ontology from the ontology 196 and retrieve or receive the verified concepts form the concept verification module 150 of the new concept verifier 140, and send the retrieved or received ontology and verified concepts to the parent concept detection module 164.

The parent concept detection module 164 is configured to, upon receiving the ontology and the verified concepts, detect a parent concept from the ontology for each of the verified concepts. In certain embodiments, the determination is similar to the function of the concept comparing module 146 and the concept proposing module 148. Specifically, for each verified concept, the parent concept detection module 164 inputs each text content in the verified concept to the classifier of one of the concepts of the ontology, and obtains a value of that inputted text content. Once values of all the text content from the verified concept against the one concept of the ontology are available, the possibility of whether the concept of the ontology is the parent concept of the verified concept is obtained. When the possibilities of the verified concept against each of the concepts in the ontology are calculated, the concept in the ontology that having the highest possibility value is determined as the parent concept of the verified concept. The parent concepts detection module 164 is further configured to, after obtaining the correspondence between the verified concept and its parent concept in the ontology, send the verified concept and its parent concept to the sibling concepts similarity module 166. In certain embodiments, the parent concepts detection module 164 is further configured to analyze each of the new concepts to obtain their respective parent concepts.

The sibling concepts similarity module 166 is configured to, upon receiving the verified concept and its parent concept, determine a most closely related sibling concept of the verified concept. Specifically, the parent concept in the ontology may include more than one low level concepts or children concepts that directly under the parent concept in the ontology. Those children concepts of the parent concept are termed sibling concepts of the verified concept. Similar to the function of the parent concept detection module 164, the sibling concept similarity module 166 is configured to determine the possibility of whether the verified concept belong to any of the sibling concepts. That is, the sibling concept similarity module 166 uses the text contents in the verified concept as input to the classifier model of each of the sibling concepts, so as to obtain the possibility of the verified concept candidate belonging to the sibling concept. When all the possibilities for each of the sibling concepts are available, the sibling concept having the highest possibility with the verified concept is determined as the most similar one of the sibling concepts. The sibling concepts similarity module 166 is further configured to send the parent concept and the most similar one of the sibling concepts to the adjustment proposing module 168.

Figure 3A:
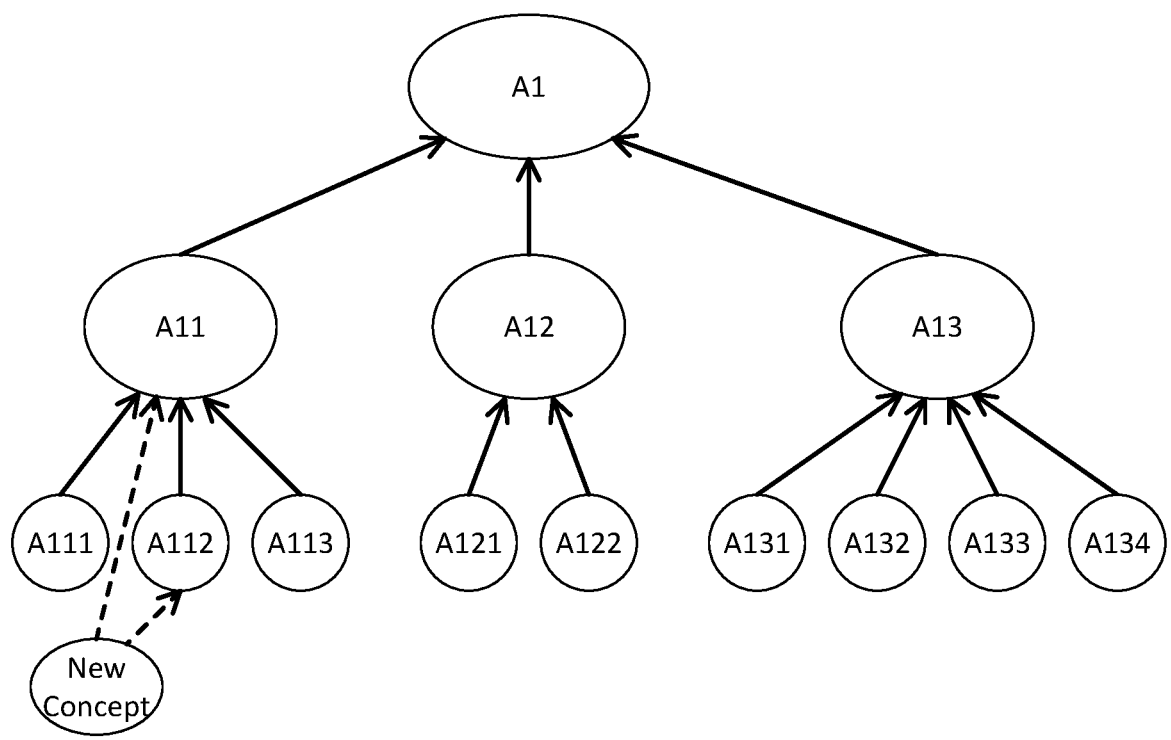
FIG. 3A schematically depicts a current ontology (partial) according to certain embodiments of the present disclosure.

The adjustment proposing module 168 is configured to, upon receiving the parent concept and the most similar sibling concept of the verified concept, propose adjustments on the ontology based on the information. In certain embodiments, the adjustment proposing module 168 is configured to propose the adjustments of the ontology by performing insert, lift, shift and merge. FIG. 3A schematically shows a current ontology (partial) according to certain embodiments of the present disclosure. As shown in FIG. 3A, the nodes are concepts of the ontology. The nodes A11, A12 and A13 have a common parent node A1, the nodes A111, A112 and A113 have a common parent node A11, the nodes A121 and A122 have a common parent node A12, and the nodes A131, A132, A133 and A134 have a common parent node A13. When the new verified concept is added, it is calculated that the new theme has the highest possibility of belonging to the node A1, that is, A11 is the parent node of the new theme. When the new theme is compared with the sibling nodes A111, A112, A113, the new theme is most similar to the sibling node A112. When insert is performed, the new theme is added as a child concept of A11, and sibling concept of A111, A112, and A113. In other words, the concept A111, A112, A113 and the new concept are child concepts of the node A11.

Figure 3B:
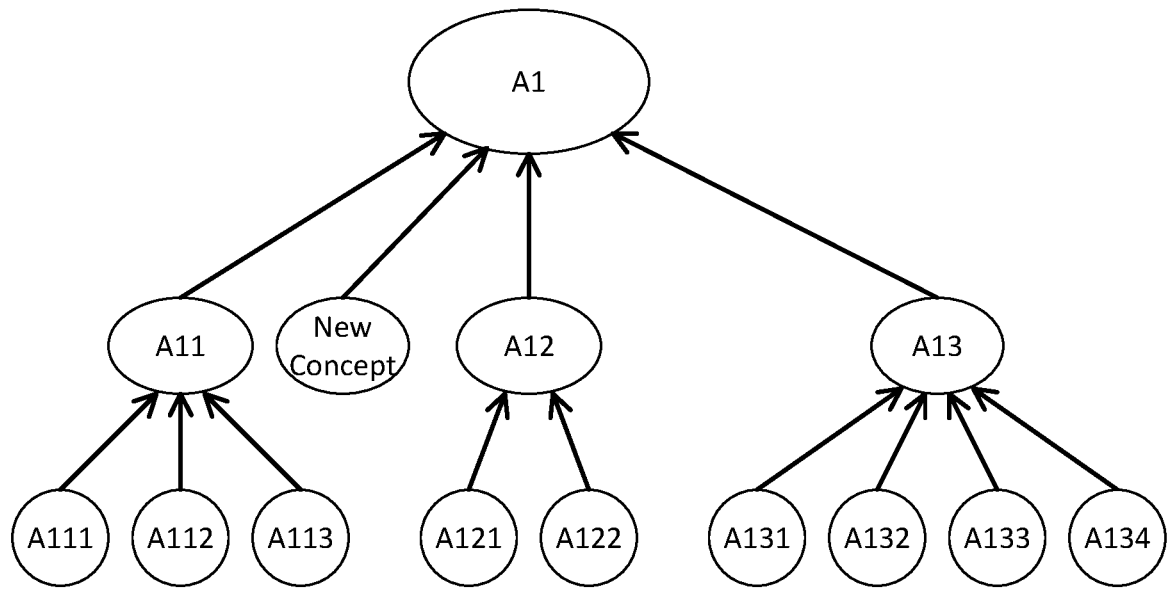
FIG. 3B schematically depicts a lift operation of adjusting an ontology according to certain embodiments of the present disclosure.
Figure 3C:
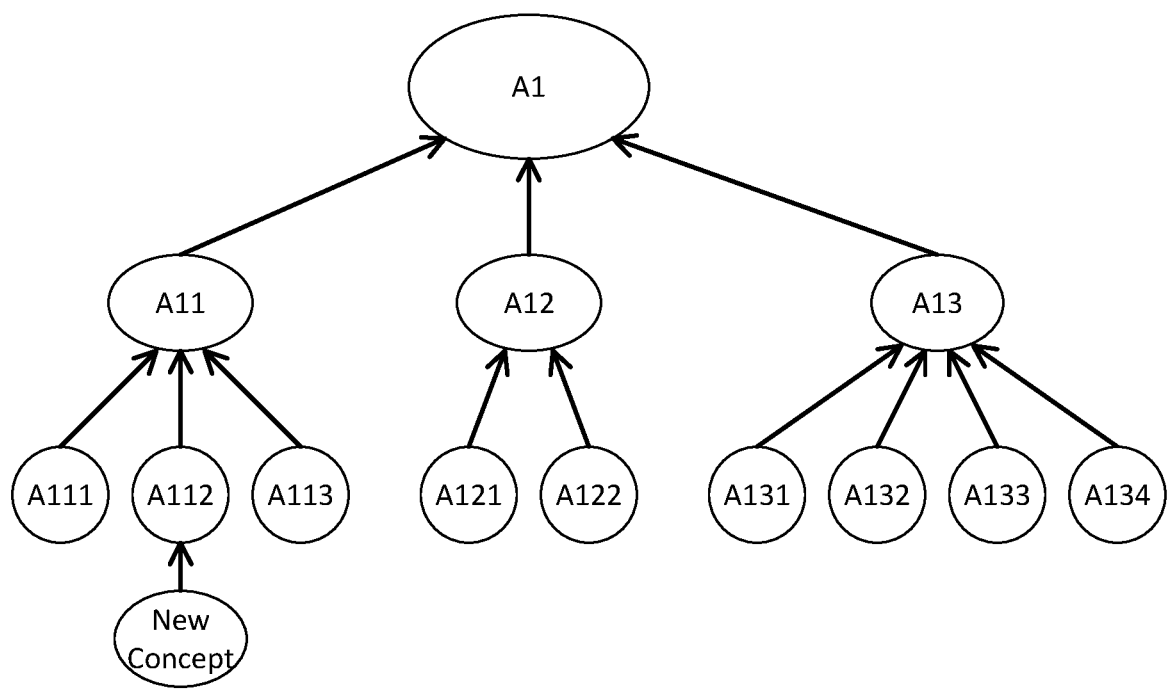
FIG. 3C schematically depicts a shift operation of adjusting an ontology according to certain embodiments of the present disclosure.
Figure 3D:
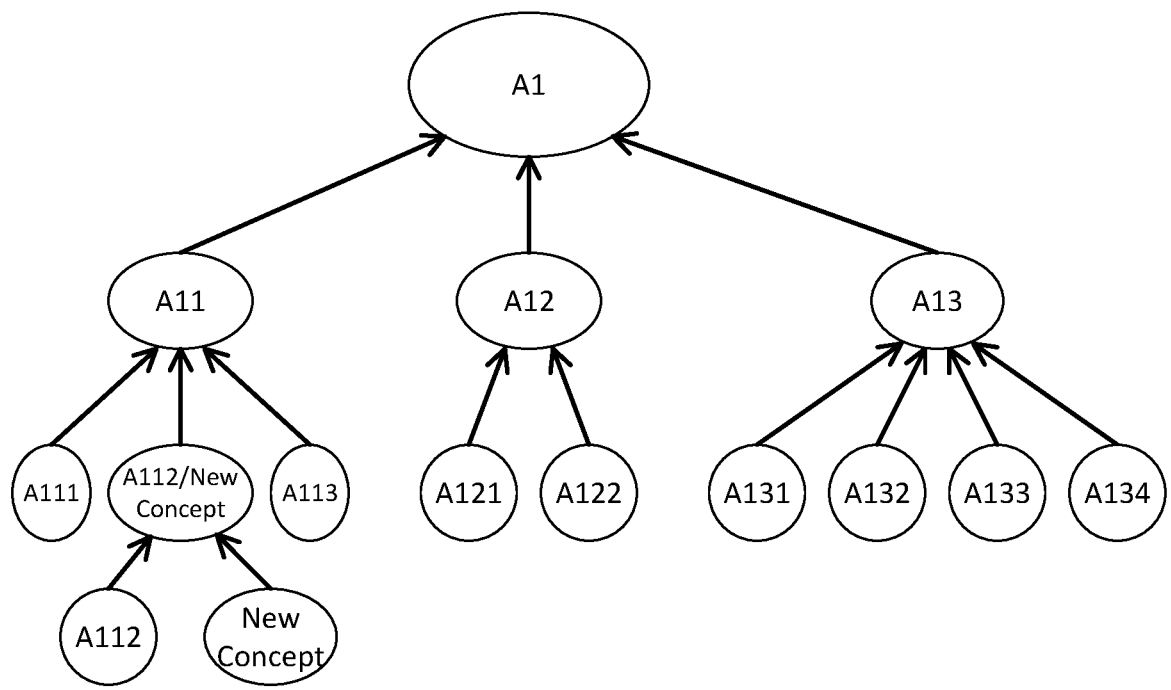
FIG. 3D schematically depicts a merge operation of adjusting an ontology according to certain embodiments of the present disclosure.

As shown in FIG. 3B, the adjustment proposing module 168 is configured to propose the adjustment by performing lift. Specifically, the node of the new theme is pointed to the node A1. In other words, after adjustment, the node A11 and the node new theme have a common parent node A1, and the node A11 and the node new concept are sibling nodes. As shown in FIG. 3C, the adjustment proposing module 168 is configured to propose the adjustment by performing shift. Specifically, the node of the new concept is pointed to the node A112. In other words, after adjustment, the node new concept is a child node of the node A112, and the node A112 is the parent node of the node new concept. As shown in FIG. 3D, the adjustment proposing module 168 is configured to propose the adjustment by performing merge. Specifically, the node of the new concept and the node of A112 are combined to form a new node A112/new concept, and the new node A112/new concept has the parent node A11. Now the nodes A111, A112/new concept, and A113 are children nodes of the node A1. Further, two children nodes are defined for the new node A112/new concept, and the two children nodes are respectively A112 and new theme. That is, the node A112/new concept is the parent node of the node A112 and the node new concept. After proposing the three types of adjustment, the adjustment proposing module 168 is further configured to send the proposed adjustments to the ontology updating module 170.

Figure 2D:
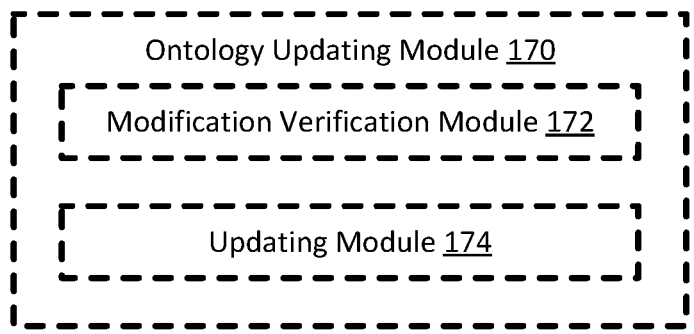
FIG. 2D schematically depict an ontology updating module according to certain embodiments of the present disclosure.

The ontology updating 170 is configured to, upon receiving the proposed adjustments from the adjustment proposing module 168 of the ontology adjusting module 160, verify the proposed adjustments, and choose the optimal proposal to update the ontology. Referring to FIG. 2D, the ontology updating module 170 includes a modification verification module 172 and an updating module 174.

The modification verification module 172 is configured to, upon receiving the proposed adjustments from the adjustment proposing module 168, verify which of the proposed adjustments is the optimal adjustment, and send the optimal adjustment to the updating module 174. In certain embodiments, the modification verification module 172 is configured to verify the adjustments by looking for the optimal hierarchy adjustment. For a given ontology hierarchies H, there exists a sequence of related adjusted hierarchies $Q=\{H_1, H_2, \ldots, H_n\}$ and related dataset D (e.g. All the text corpus we used to train and test the corresponding concept classifiers), an optimal hierarchy $H_{opt}$ is a hierarchy that:

$$H_{opt} = \underset{H}{\operatorname{argmax}} \log p(D \mid H).$$

p(D|H) indicate the likelihood of data D for the given hierarchy H. In certain embodiments, the modification verification module 172 estimates the likelihood with classification performance of a hierarchical model. In particular, the modification verification module 172 uses macro-averaged recall of the whole classification system to estimate the conditional likelihood. The macro-averaged recall of the system is the average of recall of all concept classifiers' recall on the test set.

For example, a hierarchy H comprises of M concepts. For each concept, there are a training set $A_i$ and a test set $E_i$. The modification verification module 180 trains the binary concept classifier on $A_i$, evaluates it on $E_j$ and get its recall $r_i$. Here $$recall = \frac{true\ positive}{true\ positive + false\ negative}.$$

The macro-averaged recall is $$\frac{1}{M}\sum_{i=1}^{M} r_i.$$

By comparing the recall for each of the hierarchies, the optimal hierarchy can be determined. The modification verification module 172 is further configured to send the optima hierarchy to the updating module 174.

The updating module 174 is configured to, upon receiving the optimal proposal of the adjustment, update the ontology stored in the ontology 196 using the optimal proposal.

The tuning module 180 is configured to, when the ontology is updated by the updating module 174, using the updated ontology and the corresponding dataset to tune the classifiers of the concepts of the ontology. The tuning may be performed after each of the updating of the ontology, or be performed at a pre-determined time interval such as a month, or upon instruction by the system manager.

The management interface 185 is configured to, when in operation, provide an interactive interface for presenting results and parameters to the system manager, and receiving instruction and revised parameters from the system manager. The manager interface 185 includes verification and parameters mentioned above, which may include, among other things, threshold parameters for the cluster classifier 132, semantic score threshold for the near duplicate identification module 144, threshold value for predicting concept proposing module 148, new concept verification, proposed adjustments verification, etc.

The user generated data 190 includes the historical user generated data, such as the user feedbacks on an e-commerce platform. The user generated data 290 may be arranged by a predetermined time interval, such as by week or by month.

The training data 192 includes data for training the classifiers in the system 100. Each set of data in the training data 192 may correspond to a specific classifier or other types of models, and are labeled with corresponding features. For example, a set of data entries having text are labeled with sentiment, and the set of data are used to train the sentiment analyzer 124.

The new theme database 194 stores new themes detected by the emerging theme detector 120. In certain embodiments, the new themes are stored by batch. Each batch of the new themes may correspond to the new themes detected from, for example, data entries from a week, a month, or a quarter, etc.

The ontology 196 stores the ontology of the system, which can be updated automatically or with minimal supervision by the system manager. The ontology 196 includes, among other things, the concepts, the relationship between the concepts, and the classifiers corresponding to each concepts.

In certain embodiments, the system manager may initialize the ontology 196 manually, and the initialized ontology 196 is updated and expanded after receiving more data and after performing the function of the ontology application 118.

In certain embodiments, the ontology application 118 may use a first batch of data entries, detect emerging themes using the emerging theme detector 120, and uses the classified emerging themes as the initial ontology 196.

Figure 4:
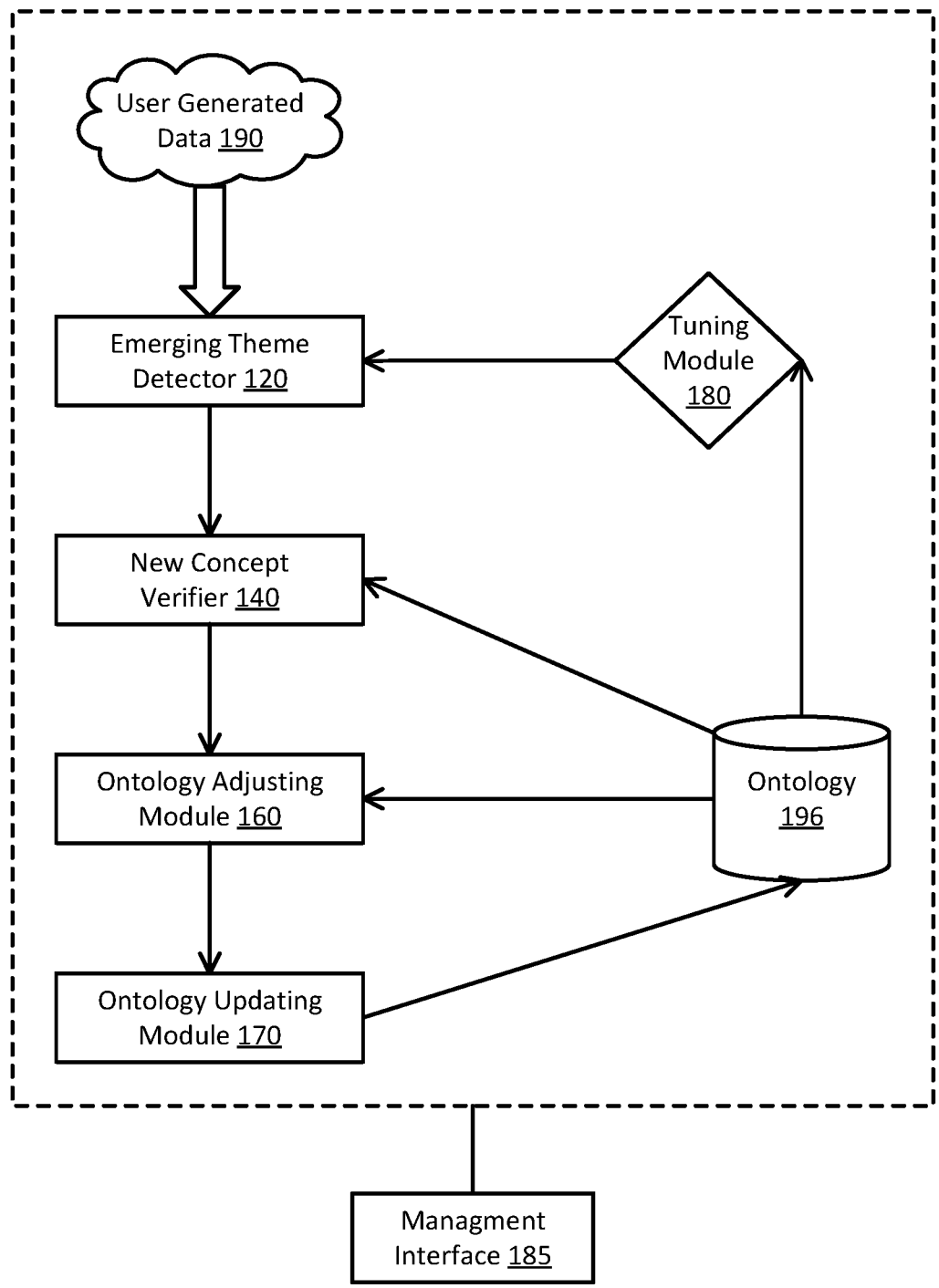
FIG. 4 schematically depicts a flow chart to build and update an evolving ontology from user-generated content according to certain embodiments of the present disclosure.

FIG. 4 schematically depicts a flow chart to build and update an evolving ontology from user-generated content according to certain embodiments of the present disclosure. In certain embodiments, the building and updating the evolving ontology is implemented by the server computing device 110 shown in FIG. 1.

As shown in FIG. 4, the user generated data 190 is provided to or retrieved by the emerging theme detector 120. The user generated data 190 may include a large amount of historical data, and the emerging theme detector 120 may only process a batch of data at a time, such as the user feedbacks in an e-commerce website in the past week. The emerging detector 120 then processes the batch of the user generated data that include many data entries, to obtain relationships between any two of the data entries. The relationship may be represented by a semantic similarity score, where the higher the score, the more similar the two data entries. Based on the semantic similarity scores, the emerging theme detector 120 clusters the data entries into different groups. The data entries in the same group have high semantic similarity score between each other. The groups are regarded as new emerging themes. In certain embodiments, the emerging theme detector 120 may also use a threshold to filter the groups, and only the groups that have a number of data entries greater than the threshold number, such as 50 or 60, are regarded as the new emerging themes. In certain embodiments, the emerging theme detector 120 further compares the detected new themes with the new themes detected in the older time, such as in the three weeks previous to the passing week, and keep only the new themes that are not shown in those previous three weeks. The emerging theme detector 120 then sends the detected new themes to the new concept verifier 140.

The new concept verifier 140, upon receiving the new themes, compares the new themes with the nodes in the ontology, where each node in the ontology represent a concept. The new concept verifier 140 calculates the novelty score of each new themes by comparing the similarity between each of the new themes and each of the concepts. The novelty score may be computed using a set of classification models. The new concept verifier 140 defines the new themes having the high novelty scores as verified new concepts or simply verified concepts. The new concept verifier 140 then sends the verified concepts to the ontology adjusting module 160.

The ontology adjusting module 160, upon receiving each of the verified concept, calculates the similarity between the verified new concept and the nodes in the ontology, and define the node having the highest similarity as the parent node of the verified concept. The parent node may have multiple children nodes. The ontology adjusting module 160 then compares the similarity between the verified concept with all the children nodes of the parent node (also termed sibling nodes of the verified concept), and determines the sibling node that has the highest similarity score with the verified concept, among those sibling nodes. That sibling node is termed determined sibling node. With the parent node and the determined sibling node at hand, the ontology adjusting module 160 then proposes several different adjustments. In certain embodiments, by performing insert, the ontology adjusting module 160 inserts the verified concept as a child node of the parent node. In certain embodiments, by performing lift, the ontology adjusting module 160 inserts the verified new concept as a sibling node of the parent node. In certain embodiments, by performing shift, the ontology adjusting module 160 inserts the verified new concept as a child node of the determined sibling node. In certain embodiments, by performing merge, the ontology adjusting module 160 merges the verified concept and the determined sibling node as a merged node. The merged node is a child node of the parent node, and the merged node is a parent node of the verified concept and the determined sibling node. The ontology adjusting module 160 then sends those proposed adjustment to the ontology updating module 170.

The ontology updating module 170, upon receiving the proposed adjustment, evaluate which of the adjustments is optimal, and uses the optimal adjustment proposal to update the ontology.

In certain embodiments, after updating the ontology 196, the tuning module 180 may further tune the whole system, and retain the related model according to the ontology changes. The models with high creditability are retained or defined with high weights, and the models with low creditability are discarded or defined with low weights.

In certain embodiments, the system further includes a management interface 185. The management interface 185 provides an interface, such as a graphic user interface (GUI) to the system manager, so that the manager can interact during the process with the application. For example, the system manage can use the management interface 185 to visualize and demonstrate keywords, novelty threshold, occurring frequencies, and summaries of the new concepts, adjust novelty score threshold, verify new concepts, etc.

In certain embodiments, the system may also include an initialization step to construct the ontology 196 from scratch. In certain embodiments, the initial ontology 196 is manually prepared by the system administrator. In certain embodiments, the ontology 196 is automatically constructed by: detecting emerging themes using certain number of user generated data, classifying those emerging themes, and construct the initial ontology 196 using the detected emerging themes as concepts of the ontology. In certain embodiments, the initialization of the ontology 196 is performed by supervising and revising the result of the above automatic method by the system manager.

Figure 5:
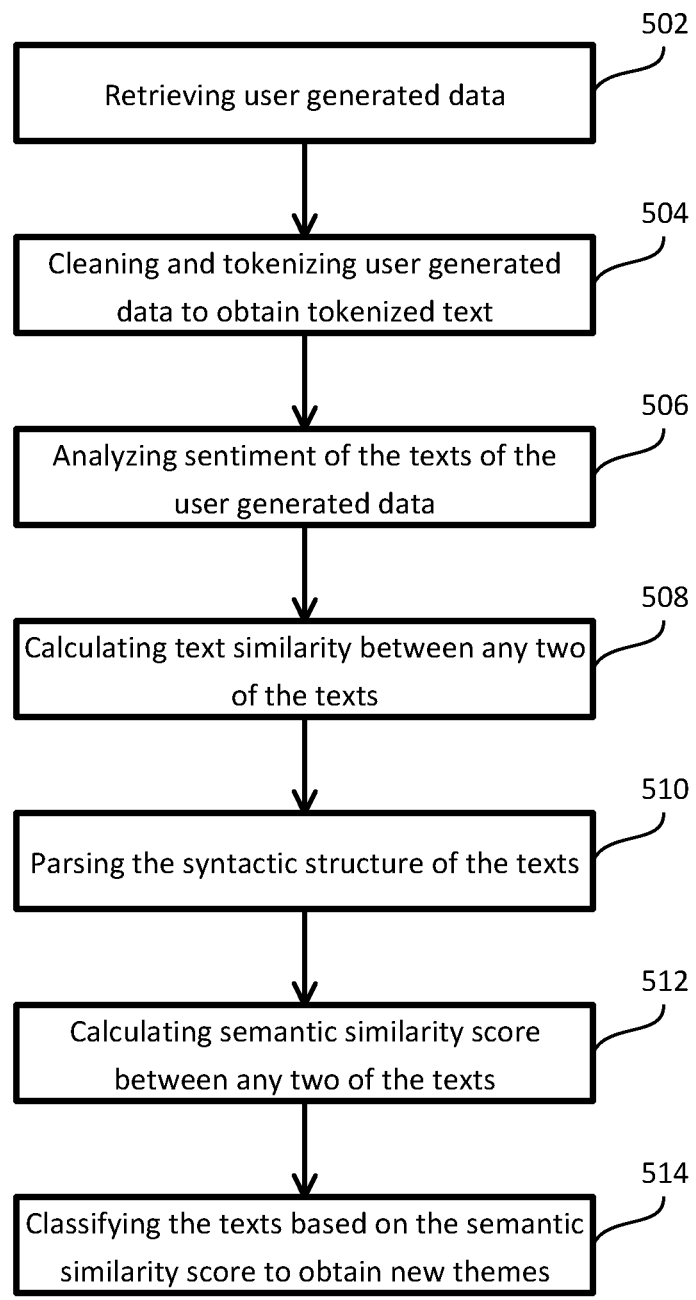
FIG. 5 schematically depicts a method for detecting emerging themes according to certain embodiments of the present disclosure.

FIG. 5 schematically depicts a method for detecting emerging themes according to certain embodiments of the present disclosure. In certain embodiments, the method is implemented by the computing device 110 shown in FIG. 1. In certain embodiments, the method shown in FIG. 5 corresponds to the function of the emerging theme detector 120. It should be particularly noted that, unless otherwise stated in the present disclosure, the steps of the method may be arranged in a different sequential order, and are thus not limited to the sequential order as shown in FIG. 5.

As shown in FIG. 5, at procedure 502, the data cleaning and tokenizer 122 retrieves or receives a batch of data entries from the user generated data 190. The batch of data entries may be, for example, user feedbacks on an e-commerce website in the last week. The number of data entries may vary, such as 10,000 data entries.

After retrieving the data entries, at procedure 504, the data cleaning and tokenizer 122 cleans the data entries, and tokenizes the cleaned data entries into numbers. The data entries, such as feedbacks, are generally text. In certain embodiments, when image is included in the data entries, the data cleaning and tokenizer may remove the image from the data entries or convert the image into texts. The data cleaning and tokenizer 122 then separates the text into words, and cleans the words by removing certain irrelevant symbols or words. After obtaining the cleaned word, the data cleaning and tokenizer 122 tokenizes each data entry into numeral representation, and sends the tokenized text of the data entries to the sentiment analyzer 124, the similarity calculator 126, and the NLP 128.

At procedure 506, the sentiment analyzer 124, upon receiving the tokenized text of the data entries, predicts sentiment polarity for each of the tokenized text. In certain embodiments, the sentiment analyzer 124 defines five sentiments, and uses a pretrained model to give five corresponding values for each data entry. The five sentiments includes positive, neutral, negative, very negative, and internet abuse. In certain embodiments, the pretrained model is a classification model such as gradient regression classifier, and the training data is retrieved from the training data 192. The training data may be a set of data entries with sentiment labels, that is, positive, neutral, negative, very negative, and internet abuse features of the data entries. When the target data entries are different, the sentiment labeling may also be changed accordingly. For example, if the data entries does not include any internet abuse data, the labels may not need to include this feature. In one example, the result of one data entry analyzed by the sentiment analyzer 124 may be [0.7, 0.2, 0.1, 0.0, 0.0], i.e., positive 0.7, neutral 0.2, negative 0.1, very negative 0.0, and internet abuse 0.0. Accordingly, the data entry is very likely a positive feedback, possibly neutral, and very low possibility of negative. After predicting sentiment polarity of the batch of data entries, the sentiment analyzer 124 sends the result to the semantic scorer 130.

At procedure 508, the similarity calculator 126, upon receiving the tokenized data entries, computes the text similarity between any two of the tokenized data entries based on sentence embedding. Specifically, the similarity calculator 126 represents the words in each text (i.e., each cleaned and tokenized data entry) by an n-dimensional vector space, where semantically similar or semantically related words come closer depending on the training model. After representation of the texts by vectors, the similarity calculator 126 calculates the similarity between any two of the texts. In certain embodiments, for calculating the similarity, the similarity calculate 126 not only considers the meaning of the words in the text, but also the relationship of the words in the texts, especially the sequence of the words in the text. In certain embodiments, the similarity score is represented by a number between 0 and 1, where 0 indicates that two data entries are distant in the vector space and have no similarity at all, and 1 indicates that the two data entries are close or overlapped in the vector space and are substantially the same. In one example, the two texts are regarded as very similar if the similarity score is greater than about 0.6-0.8, and regarded as less similar if the similarity score is lower than about 0.6. In certain embodiments, the comparison between two tokenized texts results in multiple scores, each score corresponds to one word or multiple words having similar features. For example, words in the text that related to color is chosen for comparison, so that the result of the comparison includes a similarity score that corresponds to color. After calculating the similarity scores between any two of the cleaned and tokenized data entries, the similarity calculator 126 sends the similarity scores to the semantic scorer 130.

At procedure 510, the NLP 128, upon receiving the cleaned and tokenized data entries (text), determines the syntactic structure of the text by analyzing its constituent words based on an underlying grammar. In certain embodiments, the NLP 128 uses part-of-speech tagging. In certain embodiments, the NLP 128 evaluate the syntactic or grammar complexity of the data entry, and represents the complexity as a real number. After obtaining a number for each cleaned and tokenized data entry, the NLP 128 sends the numbers to the semantic scorer 130.

In certain embodiments, the procedure 506, 508 and 510 are performed in parallel or independently.

At procedure 512, the semantic scorer 130, upon receiving the sentiment polarity of each of the data entries from the sentiment analyzer 124, the similarity scores between any two of the data entries from the similarity calculator 126, and the NLP score of each of the data entries, calculates the semantic similarity score for each pair of data entries, i.e., for any two of the data entries. The semantic scorer 130 calculates the semantic similarity score based on the above three types of features using the formula:

semantic similarity score $$\text{score} = \prod_{i=0}^{n} s_i e^{\sum_{j=0}^{k} w_j \times f_j},$$

where n corresponds to the major types of features or the feature sources: the sentiment features, the text similarity feature, and the syntactic features; $s_i$ is the weight of the features sources; $f_j$ is a feature function that measures the similarity between two data entries, and each of the feature sources, sentiment, text similarity, syntactic, may include one or more feature functions; k is the total number of feature functions; $w_j$ is a weight of $f_j$. In certain embodiments, the parameters in the formula may be obtained using a training data sets with a training model, or the parameters are pre-determined values entered by the system manager. In certain embodiments, the semantic similarity scores are positive numbers. After obtaining the semantic similarity score between each pair of data entries (clean and tokenized texts) using the above formula, the semantic scorer 130 sends the semantic similarity scores to the cluster classifier 132.

At procedure 514, the cluster classifier 132, upon receiving the semantic similarity scores between each pair (any two) of the data entries, classifies the data entries based on the semantic similarity scores. Specifically, the cluster classifier 132 groups the data entries into clusters, the data entries in the same cluster have high semantic similarity scores. In certain embodiments, a threshold is defined for a the clusters, which means that any two data entries in the same cluster has the semantic similarity score greater than the threshold score. The value of the threshold score may be determined based on the subject matter of the data entries, the required recall, and the required precision. In certain embodiments, a small threshold value is given when high recall is needed. In certain embodiments, a large threshold value is given when high precision is needed. After obtaining the clusters, the cluster classifier 132 stores the clusters into the new theme database 194. In certain embodiments, each cluster includes one or more data entries, and the cluster classifier 132 may only stores the clusters that having a large number of data entries. The threshold number of data entries in the clusters may be set at about 5-500. In certain embodiments, the threshold number is set in a range of 25-120. In certain embodiments, the threshold number is set in the range of about 50-60. In one example, the average cluster size within a week is about 50, and the threshold number is set at 60, and the stored clusters are very possible real themes or topics. The stored cluster or also named emerging themes.

By the above procedure 502-514, the emerging theme detector 120 obtains certain number of new themes, each new theme includes some data entries. The procedures may be performed repeatedly by batch in a predetermined time interval, such as weekly or monthly. In other words, the user generated entries are collected and stored by week, and the emerging theme detector 120 processes the data entries in a week when the data entries are available. Accordingly, the new theme database 194 includes different sets of new themes, each set corresponding to data entries from a specific week or a specific month.

Figure 6:
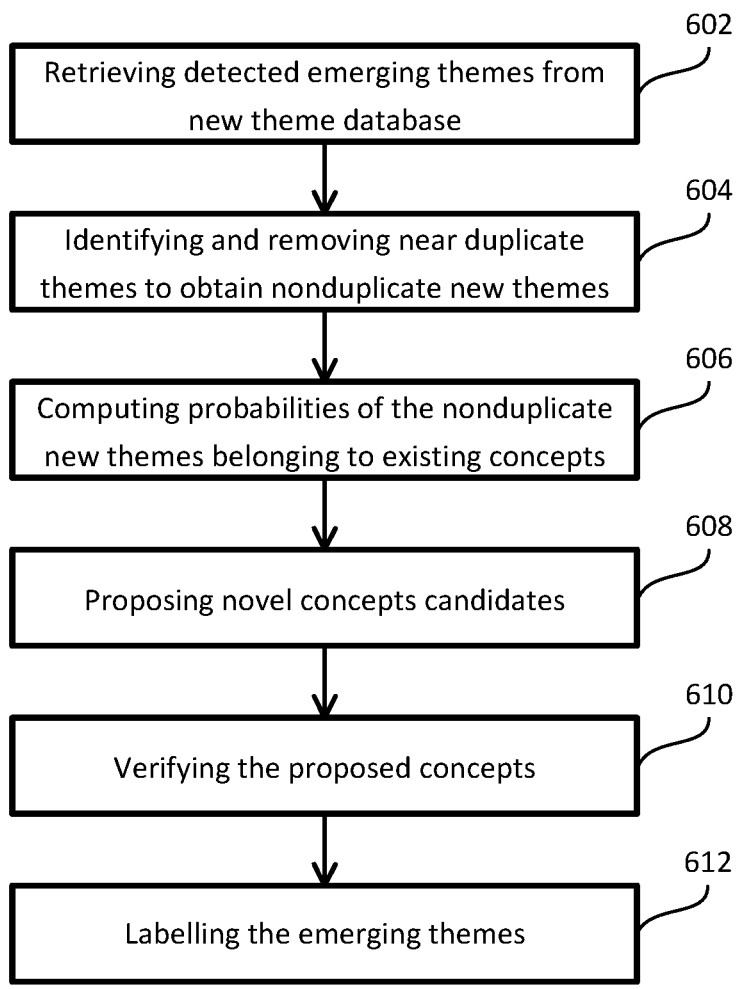
FIG. 6 schematically depicts a method for verifying new themes to obtain new concepts according to certain embodiments of the present disclosure.

FIG. 6 schematically depicts a method for verifying new themes to obtain new concepts according to certain embodiments of the present disclosure. The new concepts are verified new themes. In certain embodiments, the method is implemented by the computing device 110 shown in FIG. 1. In certain embodiments, the method shown in FIG. 6 corresponds to the function of the new concept verifier 140. It should be particularly noted that, unless otherwise stated in the present disclosure, the steps of the method may be arranged in a different sequential order, and are thus not limited to the sequential order as shown in FIG. 6. In certain embodiments, the procedures shown in FIG. 6 are performed sequentially after the procedures shown in FIG. 5.

At procedure 602, the new theme retrieving module 142 retrieves new themes from the new theme database 190. The retrieved new themes include a current batch of new themes for analysis and a few previous batches of new themes that have already been analyzed before. For example, the new theme retrieving module 142 retrieves new themes from the most recent week (hereinafter refers to week 0) and new themes from the three weeks previous to the most recent week (hereinafter refers to week—1, week—2, week—3). The batch of week 0, week—1, week—2, and week—3 respectively include, for example, 120, 130, 11, and 140 new themes. Each batch of new themes are obtained through the procedures shown in FIG. 5 by analyzing that week of data entries. The batches and the number of themes are used hereinafter for clearly describing the procedures shown in FIG. 6 only, and are not intended to limit the scope of the present disclosure. After retrieving the new themes, the new theme retrieving module 142 sends the new themes to the near duplicate identification module 144.

After retrieving the four batches of the new themes, at procedure 604, the near duplicate identification module 144 identifies duplicated themes in the week 0 themes. Specifically, for comparing whether one theme in week 0 is a duplicate of one theme in any of the themes in week—1, week—2 or week—3 (termed target theme hereinafter) the near duplicate identification module 144: first calculates semantic similarity scores between each data entry in the week 0 theme to the data entries in the target theme, and based on the semantic similarity scores, determines whether the week 0 data entry belongs to the target theme; then repeats the process and determines the possibility for each of the week 0 data entries belonging to the target theme; and after that, computes the percentage of the week 0 data entries that belong to the target theme. If the percentage is higher than a pre-determined value, the near duplicate identification module 144 determines that the week 0 theme is a duplicate of the target theme. If not, the near duplicate identification module 144 continues to compare the week 0 theme with all the other week—1, week—2 and week—3 themes. If the week 0 theme is not duplicate theme of any of the week—1, week—2 and week—3 themes, the near duplicate identification module 144 determines that the week 0 theme is a nonduplicate theme. The near duplicate identification module 144 repeats the above process for each of the week 0 themes, obtains the nonduplicate themes from the week 0 themes, and sends nonduplicate themes to the concept comparing module 146. In one example, among the 120 week 0 new themes, 90 of them have one or more duplicate themes in the week—1, week—2 or week—3 themes, and 30 of them are nonduplicate themes.

At procedure 606, the concept comparing module 146 computes whether the nonduplicate themes belong to existing concepts. Specifically, for each concept in the ontology, a binary text classifier is constructed and trained. i.e., each concept in the ontology database has its text classifier model. In certain embodiments, the classifier model is a logistic regression or gradient boosting classifier. For each theme of the nonduplicate themes (such as the 30 nonduplicate themes), the nonduplicate theme includes a number of data entries. Each data entry in the nonduplicate theme is used as an input of the classifier of one concept (termed as target concept hereinafter), so as to obtain a Boolean value, indicating if the data entry belongs to the target concept. After each of the data entries in the nonduplicate theme is calculated to determine whether it belongs to the target concept, a percentage of the data entries in the nonduplicate theme that belongs to the target concept can be computed. For example, if a nonduplicate theme T contains 100 data entries, and 90 of the data entries belong to a given target concept C, then the probability of the nonduplicate theme T belonging to the target concept C is 90%. In certain embodiments, after comparing the data entries in the nonduplicate theme with all the concepts, a highest probability is recorded corresponding to one of the concepts. As a result, each of the 30 nonduplicate themes are given a probability score against one of the concepts (the highest score when comparing with all the concepts). The concept comparing module 146 then sends those 30 probability scores, each corresponding to one of the concepts, to the concept proposing module 148.

At procedure 608, the concept proposing module 148 ranks the 30 nonduplicate themes based on their probability scores, and proposing the new themes that have a low probability score as proposed concepts. In certain embodiments, the low probability score is defined as less than about 0.4. In certain embodiments, the low probability is defined as less than 0.25. The number of new themes may be eight, and the concept proposing module 148 then sends the proposed concepts, such as the eight proposed concepts from the 30 nonduplicate new themes, to the concept verification module 150.

At procedure 610, upon receiving the proposed concepts, the concept verification module 150, presents the proposed concepts, such as the eight proposed concept, to the system administrator, and the system administrator verify the proposed concepts, for example may select five of the eight proposed concept as real concept candidates.

Then at procedure 612, the concept verification module 150 may further label the 120 week 0 new themes with "duplicated data entry," "unverified concept," or "verified concept" in the new theme data base 194, and sends the five verified concept to the ontology adjusting module 160. In certain embodiments, the concept verification may not be necessary, and the concept proposing module 148 sends the proposed concepts (such as the eight proposed concepts) directly to the ontology adjusting module 160. In certain embodiments, the verification may also be performed automatically using certain criteria, such as the feature of the theme word.

Figure 7:
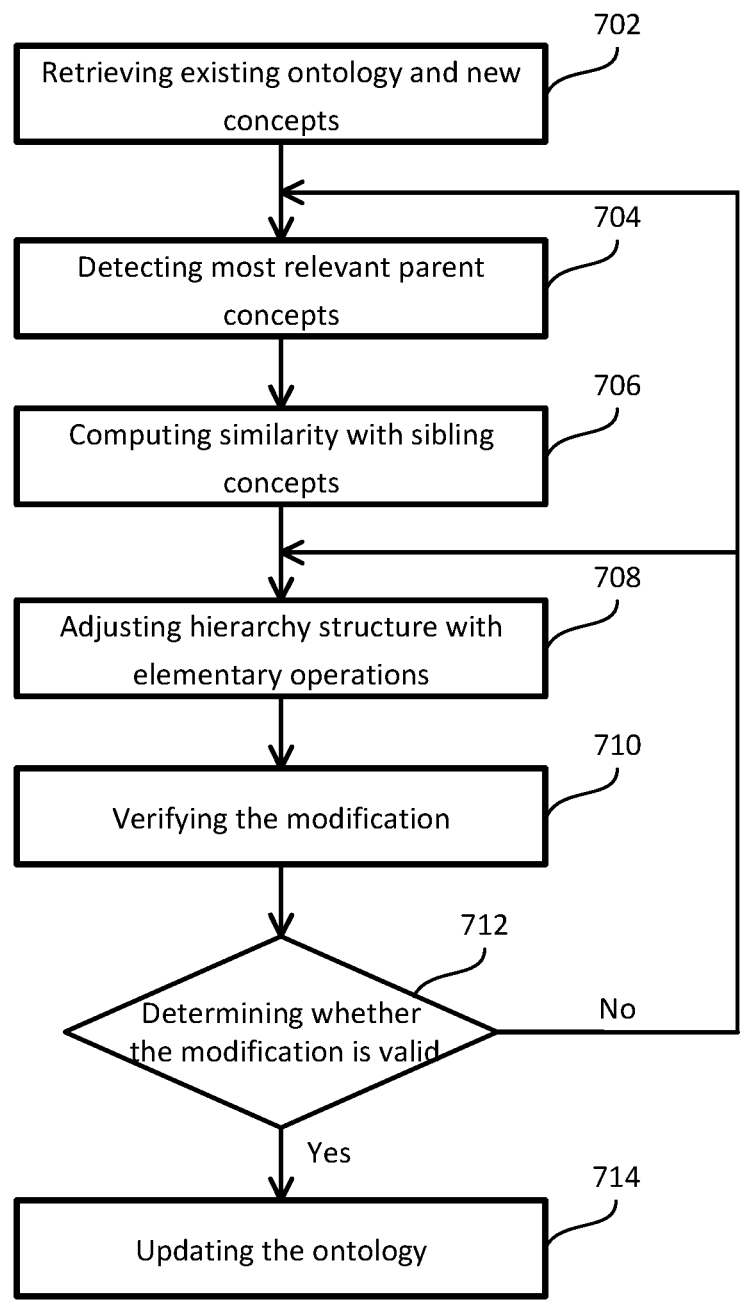
FIG. 7 schematically depicts a method for proposing ontology adjustments based on verified new concepts and updating ontology using an optimal adjustment according to certain embodiments of the present disclosure.

FIG. 7 schematically depicts a method for proposing ontology adjustments based on the verified concepts and updating the ontology using an optimal adjustment according to certain embodiments of the present disclosure. In certain embodiments, the method is implemented by the computing device 110 shown in FIG. 1. In certain embodiments, the method shown in FIG. 7 corresponds to the function of the ontology adjustment module 160 and the ontology updating module 170. It should be particularly noted that, unless otherwise stated in the present disclosure, the steps of the method may be arranged in a different sequential order, and are thus not limited to the sequential order as shown in FIG. 7. In certain embodiments, the procedures shown in FIG. 7 are performed sequentially after the procedures shown in FIG. 6.

At procedure 702, the ontology and new concept retrieving module 162 retrieves the ontology 196 and retrieves (or receive) the verified concepts from the concept verification module 150, and sends the retrieved data to the parent concept detection module 164. The following procedures are described in related to one verified concept, and each of the new verified concept should be processed similarly.

At procedure 704, in response to receiving the retrieved data, the parent concept module 164 detects a parent concept from the ontology for each of the verified concept. In certain embodiments, each of the existing concepts from the ontology has a classifier, and the verified concept includes a plurality of data entries. When comparing the verified concept with an existing concept, the parent concept module 164 inputs each of the text content of the verified concept to the classifier of the existing concept, so as to obtain a value. The value indicates whether the text of the new concept belongs to the ontology concept. When all the data entries are analyzed, the percentage of the data entries belonging to the existing concept is calculated and regarded as the possibility of whether the verified concept belongs to the existing concept. The parent concept module 164 compares the data entries of the verified concept to each of the existing concepts (nodes) in the ontology, and obtains the possibilities of whether the verified concept belonging to any of the existing concepts. The parent concept module 164 then selects the existing concept that corresponding to the highest possibility as the parent concept of the verified concept. The parent concept module 164 then sends the ontology, the selection of the parent concept, and the verified concept (or their specific identification) to the sibling concept similarity module 166. In certain embodiments, the parent concept module 164 may not only provide the most relevant parent concept, but a list of relevant parent concepts with the corresponding possibility values for the verified concept. The results may be presented and selected through the management interface 185.

At procedure 706, upon receiving the ontology, the parent concept, and the verified concept, the sibling concept similarity module 166 determines all child concepts of the parent concept, which is also termed sibling concepts of the verified concept; calculates the possibilities of the data entries in the verified concept belonging to one of the sibling concept using the classifier of the sibling concept; calculates the percentage of data entries belonging to the sibling concept; repeating the process to calculate percentages of the data entries against each of the sibling concepts; and selects the one sibling concept with the highest percentage. Then the sibling concept similarity module 166 sends the parent concept and the most closed related sibling concept (having the highest percentage) to the adjustment proposing module 168. In certain embodiments, the sibling concept similarity module 166 may not only provide the closely related sibling concept, but a list of related sibling concepts with the corresponding possibility values for the verified concept. In certain embodiments, the sibling concept similarity module 166 may include more than one list of sibling concepts, each list corresponding to one relevant parent concepts, and the system manager views and selects the parent concept and the sibling concept for the verified concept through the through the management interface 185.

At procedure 708, upon receiving the most relevant parent concept and the most closely related sibling concept, the adjustment proposing module 168 proposes several ways of adjusting hierarchy structure of the ontology. In certain embodiments, the adjustment proposing module 168 may insert the new concept candidate as a child node of the parent concept. In certain embodiments, the adjustment proposing module 168 may proposes the elementary operations of lift, shift and merge as shown in FIGS. 3B-3D. In certain embodiments, the hierarch structure adjusting module 168 then sends the proposed adjustments to the modification verification module 172.

At procedure 710, the modification verification module 172, upon receiving the proposed adjustment, verifies the adjustment. Specifically, for a dataset D, each proposed adjustment has a corresponding hierarchy. The optimal hierarchy from the plurality of hierarchies can be determined by:

$$H_{opt} = \underset{H}{\operatorname{argmax}} \log p(D \mid H).$$

The optimal hierarchy is then defined as the verified hierarchy. In certain embodiments, the manager interface 185 may provide means for the system manager to change the parameters, such as recalls, so as to change the result of the optimal hierarchy, and optimize the results. After verification, the modification verification module 172 present the verification result through the manager interface 185, which may include the list of the proposed adjustment and the numerical values indicating whether the proposed adjustments are optimal.

At procedure 712, the system manager may validate the verified adjustments by selecting one of the proposed adjustments through the manager interface 185, and if the validation selection is yes, the validation is sent by the manager interface 185 to the updating module 174. If the system manager determines that the adjustment(s) is not valid, he may provide an instruction to the parent concept module 164 via the manager interface 185, such that the parent concept 164 detects a parent concept for another verified concept. In certain embodiments, the system manager may provide an instruction to the adjustment proposing module 168 via the manager interface 185, such that the adjustment proposing module 168 proposes different adjustment for the hierarchy using different parameters. In certain embodiments, the validation step is not necessary, and the verified adjustment is sent directly to the update module 174.

At procedure 714, upon receiving the validated adjustment or the verified adjustment, the updating module 174 updates the ontology using the validate adjustment.

In certain embodiments, the method further includes a tuning mechanism, where the tuning module 180 analyzes the updated ontology, and retrain the related models according to the updated ontology.

In summary, certain embodiments of the present disclosure provides a semantic analysis pipeline to automatically mining and detecting emerging themes and new concepts from user-generated data. Further, a management interface is provided to present the detected themes along with statistic information, generated summarization, sentiment distribution, and receive instructions from the system manager to adjust parameters of the system.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

REFERENCES

1. Tomas Mikolov, Ilya Sutskever et al, Distributed representations of words and phrases and their compositionality, 2013, arXiv: 1310.4546 [cs.CL]
2. Quoc Le, Tomas Mikolov, Distributed representations of sentences and documents, Proceedings of the 31st International Conference on Machine Learning, Beijing, China, 2014, JMLR 32(2): 1188-1196.
3. Yoon Kim, Convolutional Neural Networks for Sentence Classification, arXiv:1408.5882 [cs.CL].
4. Lei Tang, Jianping Zhang, Huan Liu, Automatically adjusting content taxonomies for hierarchical classification, Proceedings, 2006.
5. Bo Pang and Lillian Lee, Opinion mining and sentiment analysis, Foundations and Trends in Information Retrieval, 2008 V2(1-2): 1-135.
6. David M Blei, Probabilistic topic models, Communications of the ACM, 2012, V55(4): 77-84.
7. Kunal Punera, Suju Rajan, Joydeep Ghosh, Automatically learning document taxonomies for hierarchical classification, Special interest tracks and posters of the 14th international conference on World Wide Web, 2005, pp. 1010-1011.
8. Mikolov, Tomas; et al. Efficient estimation of word representations in vector space, 2013, CoRR, abs/1301.3781.
9. Sanjeev Arora, Yingyu Liang, Tengyu Ma, A simple but tough-to-beat baseline for sentence embeddings, ICLR 2017.
10. Yiming Yang, Thomas Ault, Thomas Pierce and Charles W Lattimer, Improving text categorization methods for event tracking, SIGIR '00 Proceedings of the 23rd annual international ACM SIGIR conference on Research and development in information retrieval, 2000, pp. 65-72.
11. Jian Zhang, Zoubin Ghahramani and Yiming Yang, A probabilistic model for online document clustering with application to novelty detection, NIPS'04 Proceedings of the 17th International Conference on Neural Information Processing Systems, 2004, pp 1617-1624.
12. Matt J. Kusner, Yu Sun, Nicholas I. Kolkin, Kilian Q. Weinberger, From word embeddings to document distances, Proceedings of the 32nd International Conference on Machine Learning, Lille, France, JMLR: W&CP, 2015, v37: 857-966.
13. Dingquan Wang, Weinan Zhang, Gui-Rong Xue, and Yong Yu, Deep classifier for large scale hierarchical text classification, Proceedings, 2009.
14. David M. Blei, John D. Lafferty, Dynamic topic models, Proceedings of the 23rd International Conference on Machine Learning, Pittsburgh, Pa., 2006, pp 113-120.
15. Wilas Chamlertwat, Pattarasinee Bhattarakosol, Tippakorn Rungkasiri, Discovering consumer insight from twitter via sentiment analysis, Journal of Universal Computer Science, 2012, V18(8): 973-992.
16. https://github.com/dmlc/xgboost
17. Nagaraju Bandaru, Eric D. Moyer, Shrisha Radhakrishna, Method and system for analyzing user-generated content, U.S. Published Patent Application No. 2008/0133488 A1, 2008.
18. Rui Cai, Qiang Hao, Changhu Wang, Rong Xiao, Lei Zhang, Mining topic-related aspects from user generated content, U.S. Pat. No. 8,458,115 B2, 2013.
19. Rajeev Dadia, Vidya Sagar, Anisingaraju, Prashanth Talanki, Systems and methods for analyzing consumer sentiment with social perspective insight, U.S. Published Patent Application No. 2016/0196564A1, 2016.

What is claimed is:
1. A method for constructing an evolving ontology database comprising:
receiving, by a computing device, a plurality of data entries;
calculating, by the computing device, semantic similarity scores between any two of the data entries based on feature sources and feature similarities of the data entries;
clustering, by the computing device, the data entries into a plurality of current themes based on the semantic similarity scores;
selecting, by the computing device, new concepts from the current themes by comparing the current themes with a plurality of previous themes prepared using previous data entries; and
updating, by the computing device, the evolving ontology database using the new concepts,
wherein the step of updating the evolving ontology database comprises:
detecting a parent concept by comparing at least one verified concept with concepts in the ontology;
computing similarity between the at least one verified concept and sibling concepts to obtain a most similar sibling concept from the sibling concepts, wherein the sibling concepts are child concepts of the parent concept, and the most similar sibling concept is the concept having a highest possibility among possibilities where the at least one verified concept belongs to the sibling concepts;
proposing ontology adjustments based on the parent concept and the most similar sibling concept; and
using an optimal adjustment from proposed ontology adjustments to update the ontology, wherein, the optimal adjustment is an adjustment having a hierarchy as follows:

$$H_{opt} = \mathrm{argmax}_H \log p(D \mid H)$$

wherein H is a given ontology hierarchies, $Q=\{H_1, H_2, \ldots, H_n\}$ and D are a sequence of related adjusted hierarchies and related dataset used for training and testing.

2. The method of claim 1, wherein the semantic similarity scores between any two of the data entries are calculated by:

$$\mathrm{score} = \prod_{i=0}^{n} s_i e^{\sum_{j=0}^{k} w_j \times f_j},$$

semantic similarity, wherein $s_i$ is weight of the features sources, $f_j$ is one of the feature similarities between the two of the data entries, $w_j$ is a weight of $f_j$, and j, k and n are positive integers.

3. The method of claim 2, wherein the data entries are user generated feedbacks, and the step of calculating semantic similarity scores comprises:
predicting sentiment similarity values by a sentiment analyzer, the sentiment similarity values representing similarity between the two data entries in regard to positive feedback, negative feedback, neutral feedback, very negative feedback, and internet abuse;
predicting text similarity values by a similarity calculator, the text similarity values representing similarity between semantic meaning of text extracted from the two data entries; and
predicting syntactic similarity values by a neutral language parser, the syntactic similarity values representing syntactic complexity of the text of the two data entries.

4. The method of claim 3, wherein the step of clustering the data entries further comprises:
calculating the semantic similarity score for the two data entries using the sentiment similarity values, the text similarity values, and the syntactic similarity values.

5. The method of claim 2, wherein the step of selecting the new concepts from the current themes comprises:
retrieving the current themes and the previous themes;
identifying duplicate themes from the current themes and the previous themes;
removing the duplicated themes from the current themes to obtain non-duplicate themes;
comparing the non-duplicate themes to concepts in the ontology database to obtain novel concepts candidates, wherein the novel concepts candidates are the non-duplicate themes that have a similarity lower than a pre-determined threshold to any of the concepts in the ontology database; and
verifying the novel concepts candidates according to an instruction from a manager of the ontology database, to obtain the new concepts.

6. The method of claim 1, wherein the proposed ontology adjustment comprises an insertion adjustment, and in the insertion adjustment, the new concept is defined as a child node of the parent concept.

7. The method of claim 1, wherein the proposed ontology adjustment comprises a lift adjustment, and in the lift adjustment, the new concept is defined as a sibling node of the parent concept.

8. The method of claim 1, wherein the proposed ontology adjustment comprises a shift adjustment, and in the shift adjustment, the new concept is defined as a child node of the most similar sibling concept.

9. The method of claim 1, wherein the proposed ontology adjustment comprises a merge adjustment, and in the merge adjustment, the new concept is combined with the most similar sibling concept to form a combined concept, the combined concept is defined as a child node of the parent concept, and the new concept and the most similar sibling concept are defined as child nodes of the combined concept.

10. The method of claim 2, wherein each concept in the ontology data base is defined by a classification model, and the classification model comprises a logistic regression model and a gradient boosting classifier.

11. The method of claim 10, wherein the step of updating the evolving ontology database comprises updating labels of the plurality of data entries, and the method further comprises: tuning the classification model using the updated data entries.

12. A system for constructing an evolving ontology database, the system comprising a computing device, the computing device comprising a processor and a storage device storing computer executable code, wherein the computer executable code, when executed at the processor, is configured to:
receive a plurality of data entries;
calculate semantic similarity scores between any two of the data entries based on feature sources and feature similarities of the data entries;
cluster the data entries into a plurality of current themes based on the semantic similarity scores;
select new concepts from the current themes by comparing the current themes with a plurality of previous themes prepared using previous data entries; and
update the evolving ontology database using the new concepts,
wherein the computer executable code is configured to update the evolving ontology data base by:
detecting a parent concept by comparing at least one verified concept with concepts in the ontology;
computing similarity between the at least one verified concept and sibling concepts to obtain a most similar sibling concept from the sibling concepts, wherein the sibling concepts are child concepts of the parent concept, and the most similar sibling concept is the concept having a highest possibility among possibilities where the at least one verified concept belongs to the sibling concept;
proposing ontology adjustments based on the parent concept and the most similar sibling concept; and
using an optimal adjustment from proposed ontology adjustments to update the ontology, wherein, the optimal adjustment is an adjustment having a hierarchy as follows:

$$H_{opt} = \underset{H}{\operatorname{argmax}} \log p(D|H)$$

wherein H is a given ontology hierarchies, $Q=\{H_1, H_2, \ldots, H_n\}$ and D are a sequence of related adjusted hierarchies and related dataset used for training and testing.

13. The system of claim 12, wherein the semantic similarity scores between any two of the data entries are calculated by:

$$\text{score} = \prod_{i=0}^{n} s_i e^{\sum_{j=0}^{k} w_j \times f_j},$$

semantic similarity wherein $s_i$ is weight of features sources, $f_j$ is a feature similarity between the two of the data entries, $w_j$ is a weight of $f_j$, and j, k and n are positive integers.

14. The system of claim 13, wherein the data entries are user generated feedbacks, and the computer executable code is configured to calculate semantic similarity scores by:
predicting sentiment similarity values by a sentiment analyzer, the sentiment similarity values representing similarity between the two data entries in regard to positive feedback, negative feedback, neutral feedback, very negative feedback, and internet abuse;
predicting text similarity values by a similarity calculator, the text similarity values representing similarity between semantic meaning of text extracted from the two data entries; and
predicting syntactic similarity values by a neutral language parser, the syntactic similarity values representing syntactic complexity of the text of the two data entries.

15. The system of claim 13, wherein the computer executable code is configured to select the new concepts from the current themes by:
retrieving the current themes and the previous themes;
identifying duplicate themes from the current themes and the previous themes;
removing the duplicated themes from the current themes to obtain non-duplicate themes;
comparing the non-duplicate themes to concepts in the ontology database to obtain novel concepts candidates, wherein the novel concepts candidates are the non-duplicate themes that have a similarity lower than a pre-determined threshold to any of the concepts in the ontology database; and
verifying the novel concepts candidates according to an instruction from a manager of the ontology database, to obtain the new concepts.

16. The system of claim 12, wherein the proposed ontology adjustments comprises an insertion adjustment, a lift adjustment, a shift adjustment, and a merge adjustment, and the computer executable code is configured to:
in the insertion adjustment, define the new concept as a child node of the parent concept;
in the lift adjustment, define the new concept as a sibling node of the parent concept;
in the shift adjustment, defined the new concept as a child node of the most similar sibling concept; and
in the merging adjustment, combine the new concept with the most similar sibling concept to form a combined concept, define the combined concept as a child node of the parent concept, and define the new concept and the most similar sibling concept as child nodes of the combined concept.

17. A non-transitory computer readable medium storing computer executable code, wherein the computer executable code, when executed at a processor of a computing device, is configured to:
receive a plurality of data entries;
calculate semantic similarity scores between any two of the data entries;
cluster the data entries into a plurality of current themes based on the semantic similarity scores;
select new concepts from the current themes by comparing the current themes with a plurality of previous themes prepared using previous data entries; and
update the evolving ontology database using the new concepts,
wherein the computer executable code is configured to update the evolving ontology data base by:
detecting a parent concept by comparing at least one verified concept with concepts in the ontology;
computing similarity between the at least one verified concept and sibling concepts to obtain a most similar sibling concept from the sibling concepts, wherein the sibling concepts are child concepts of the parent concept, and the most similar sibling concept is the concept having a highest possibility among possibilities where the at least one verified concept belongs to the sibling concept;
proposing ontology adjustments based on the parent concept and the most similar sibling concept; and
using an optimal adjustment from proposed ontology adjustments to update the ontology, wherein, the optimal adjustment is an adjustment having a hierarchy as follows:

$$H_{opt} = \underset{H}{\operatorname{argmax}} \log p(D | H)$$

wherein H is a given ontology hierarchies, $Q=\{H_1, H_2, \ldots, H_n\}$ and D are a sequence of related adjusted hierarchies and related dataset used for training and testing.

18. The non-transitory computer readable medium of claim 17, wherein the semantic similarity scores between any two of the data entries are calculated by:

$$\text{score} = \prod_{i=0}^{n} s_i e^{\sum_{j=0}^{k} w_j \times f_j},$$

semantic similarity, wherein $s_i$ is weight of features sources, $f_j$ is a feature similarity between the two of the data entries, $w_j$ is a weight of $f_j$, and j, k and n are positive integers.

* * * * *